(12) United States Patent
Minoo et al.

(10) Patent No.: US 10,771,784 B2
(45) Date of Patent: **\*Sep. 8, 2020**

(54) SYSTEM FOR CODING HIGH DYNAMIC RANGE AND WIDE COLOR GAMUT SEQUENCES

(71) Applicant: ARRIS Enterprises LLC, Suwanee, GA (US)

(72) Inventors: Koohyar Minoo, San Diego, CA (US); Zhouye Gu, San Diego, CA (US); David M. Baylon, San Diego, CA (US); Ajay Luthra, San Diego, CA (US)

(73) Assignee: ARRIS Enterprises LLC, Suwanee, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/143,067

(22) Filed: Sep. 26, 2018

(65) Prior Publication Data

US 2019/0028706 A1 Jan. 24, 2019

Related U.S. Application Data

(63) Continuation of application No. 15/217,046, filed on Jul. 22, 2016, now Pat. No. 10,116,938.

(Continued)

(51) Int. Cl.
*H04N 19/124* (2014.01)
*H04N 19/46* (2014.01)
(Continued)

(52) U.S. Cl.
CPC ......... *H04N 19/124* (2014.11); *H04N 19/117* (2014.11); *H04N 19/136* (2014.11);
(Continued)

(58) Field of Classification Search
None
See application file for complete search history.

(56) References Cited

U.S. PATENT DOCUMENTS 9,819,956 B2 \* 11/2017 Gu .......................... G06T 5/009
10,116,938 B2 \* 10/2018 Minoo ................. H04N 19/124
(Continued)

FOREIGN PATENT DOCUMENTS

WO      2016/140954 A1    9/2016
WO      2016140954 A1    9/2016

OTHER PUBLICATIONS

R. Goris, et al., "Philips response to CfE for HDR and WCG", 112. MEPG Meeting; Jun. 22, 2015-Jun. 26, 2015; Warsaw (Motion Picture Expert Group or ISO/IEC JTC1/SC29/WG11); No. m36266, Jun. 23, 2015 (Jun. 23, 2015); XP030064634, the whole document.

(Continued)

*Primary Examiner* — Reza Aghevli
(74) *Attorney, Agent, or Firm* — Chernoff, Vilhauer, McClung & Stenzel, LLP

(57) ABSTRACT

A method of encoding a digital video data applies adaptive pre-processing to data representing high dynamic range (HDR) and/or wide color gamut (WCG) image data prior to encoding and complementary post-processing to the data after decoding in order to allow at least partial reproduction of the HDR and/or WCG data. The example methods apply one or more color space conversions, and a perceptual transfer functions to the data prior to quantization. The example methods apply inverse perceptual transfer functions and inverse color space conversions after decoding to recover the HDR and/or WCG data. The transfer functions are adaptive so that different transfer functions may be applied to video data sets including different groups of frames, frames or processing windows in a single frame.

(Continued)

Information on the data set and information on the applied transfer function is passed as metadata from the encoder to the decoder.

6 Claims, 11 Drawing Sheets

Related U.S. Application Data

(60) Provisional application No. 62/195,342, filed on Jul. 22, 2015.

(51) Int. Cl.
| | |
|---|---|
| *H04N 19/117* | (2014.01) |
| *H04N 19/136* | (2014.01) |
| *H04N 19/36* | (2014.01) |
| *H04N 19/172* | (2014.01) |
| *H04N 19/182* | (2014.01) |
| *H04N 19/186* | (2014.01) |
| *H04N 19/174* | (2014.01) |
| *H04N 19/179* | (2014.01) |

(52) U.S. Cl.
CPC ......... *H04N 19/172* (2014.11); *H04N 19/182* (2014.11); *H04N 19/186* (2014.11); *H04N 19/36* (2014.11); *H04N 19/46* (2014.11); *H04N 19/174* (2014.11); *H04N 19/179* (2014.11)

(56) References Cited

U.S. PATENT DOCUMENTS

| | | | | |
|---|---|---|---|---|
| 10,116,954 | B2* | 10/2018 | Gu | G06T 5/009 |
| 10,313,687 | B2* | 6/2019 | Stessen | H04N 1/6027 |
| 10,432,955 | B2* | 10/2019 | Gu | G06T 5/009 |
| 2014/0348232 | A1* | 11/2014 | Leontaris | H04N 19/597 375/240.12 |
| 2015/0201222 | A1* | 7/2015 | Mertens | H04N 19/46 382/233 |
| 2015/0245044 | A1* | 8/2015 | Guo | G09G 5/10 375/240.03 |
| 2015/0271509 | A1 | 9/2015 | Minoo et al. | |
| 2015/0350514 | A1* | 12/2015 | Zhai | H04N 5/2355 348/222.1 |
| 2016/0165256 | A1* | 6/2016 | Van Der Vleuten | G09G 5/10 375/240.01 |
| 2016/0241829 | A1* | 8/2016 | Qu | G09G 5/006 |
| 2016/0316207 | A1 | 10/2016 | Minoo et al. | |
| 2016/0316215 | A1* | 10/2016 | Minoo | H04N 19/176 |
| 2016/0360213 | A1* | 12/2016 | Lee | H04N 19/132 |
| 2016/0360235 | A1* | 12/2016 | Ramasubramonian | H04N 19/86 |
| 2016/0371822 | A1* | 12/2016 | Le Pendu | H04N 19/117 |
| 2017/0026646 | A1 | 1/2017 | Minoo et al. | |
| 2017/0064334 | A1* | 3/2017 | Minoo | H04N 19/60 |
| 2017/0085879 | A1* | 3/2017 | Minoo | H04N 19/177 |
| 2017/0085880 | A1* | 3/2017 | Minoo | H04N 19/44 |
| 2017/0085889 | A1* | 3/2017 | Baylon | H04N 19/124 |
| 2017/0085895 | A1* | 3/2017 | Gu | H04N 19/136 |
| 2017/0085897 | A1* | 3/2017 | Narasimhan | H04N 19/186 |
| 2017/0171565 | A1* | 6/2017 | Le Leannec | H04N 19/50 |
| 2017/0180759 | A1* | 6/2017 | Mertens | H04N 19/98 |
| 2017/0223367 | A1* | 8/2017 | Stessen | H04N 1/6027 |
| 2017/0310981 | A1* | 10/2017 | Agostinelli | H04N 19/187 |
| 2017/0374390 | A1* | 12/2017 | Leleannec | H04N 19/463 |

OTHER PUBLICATIONS

D. Baylon, et al., "Response to Call for Evidence for HDR and WCG Video Coding" Arris, Dolby and InterDigital, 112. MEPG Meeting; Jun. 22, 2015-Jun. 26, 2015; Warsaw (Motion Picture Expert Group or ISO/IEC JTC1/SC29/WG11); No. m36264, Jun. 23, 2015 (Jun. 23, 2015); XP030064632; the whole document.

S. Lasserre, et al., "Technicolor's response to CfE for HDR and WCG (category 1)", MEPG Meeting; Jun. 22, 2015-Jun. 26, 2015; Warsaw (Motion Picture Expert Group or ISO/IEC JTC1/SC29/WG11); No. m36263, Jun. 21, 2015 (Jun. 21, 2015); XP030064631, the whole document.

F. Le La Cr Annec, et al., "Usage of modulation channel for high bit-depth signal encoding", 18. JCT-VC Meeting, Jun. 30, 2014-Jul. 9, 2014; Sapporo (Joint Collaborative Team on Video Coding of ISO/IEC JTC1/SC29/WG11 and ITU-T 3a16); URL: http://wftp3.itu.int/av-arch/jctvc-site/, No. JCTVC-R0267, Jun. 26, 2014 (Jun. 26, 2014), XP030116574, the whole document.

J.W. Lee, et al., "Local tone mapping using the K-means algorithm and automatic gamma setting", IEEE Transactions on Consumer Electronics, IEEE Service Center, New York, NY, US, vol. 57, No. 1, Feb. 1, 2011 (Feb. 1, 2011), pp. 209-217, XP011478021; ISSN:0098-3063, D01; 10.1109/TCE.2011.5735504, the whole document.

R. Brondijk, et al., "Candidate Test Model for HEVC extension for HDR and WCG video coding", 113. MPEG Meeting; Oct. 19, 2015-Oct. 23, 2015, Geneva (Motion Picture Expert Group or ISO/IEC JTC1/SC29/WG11), No. m37285, Oct. 18, 2015 (Oct. 18, 2015), XP030065653, the whole document.

Meylan et al., "Model of retinal local adaptation for the tone mapping pf color filter array images", J. Opt. Soc Am. A, vol. 24, No. 9, Sep. 2007, pp. 2807-2816; 2007.

SMPTE Standards, SMPTE ST 2084:2014, High Dynamic Range Electo-Optical, Transfer Function of Mastering Reference Displays, pp. 1-14; 2014.

European Examination Report Re: Application No. 16748411.2. Provided in IDS submitted on May 14, 2020.

Rocco Goris et al: "Philips response to CfE for HOR and WCG", 112. MPEG Meeting; Jun. 22, 2015-Jun. 23, 2015; Warsaw; (Motion Picture Expert Group or ISO/IEC JTC1 /SC29/WG11 ), No. m36266, Jun. 23, 2015 (Jun. 23, 2015), XP030064634. Provided in IDS submitted on May 14, 2020.

Baylon D et al: "Response to Call for Evidence for HOR and WCG Video Coding: Arris, Dolby and InterDigital", 112. MPEG Meeting; Jun. 22, 2015-Jun. 26, 2015; Warsaw; (Motion Picture Expert Group or ISO/IEC JTC1 / SC29/WG11 ), No. m36264, Jun. 23, 2015 (Jun. 23. 2015), XP030064632. Provided in IDS submitted on May 14, 2020.

Lasserre S et al: "Technicolor's response to CfE for HOR and WCG (category 1 )", 112. MPEG Meeting; Jun. 22, 2015-Jun. 26, 2015; Warsaw; (Motion Picture Expert Group or ISO/IEC JTC1/SC29/WG11 ), No. m36263, Jun. 21, 2015 (Jun. 21, 2015), XP030064631. Provided in IDS submitted on May 14, 2020.

Le La Cr Annec Fet al: "Usage of modulation channel for high bit-depth signal encoding", 18. JCT-VC Meeting; Jun. 30, 2014-Sep. 7, 2014; Sapporo; (Joint Collaborative Team on Video Coding of ISO/IEC JTCl/SC29/WG11 and ITU-T SG:16 ); URL: http://wftp3.itu.int/av-arch/jctvc-site/, No. JCTVC-R0267, Jun. 26, 2014 (Jun. 26, 2014), XP030116574. Provided in IDS submitted on May 14, 2020.

Ji Won Lee et al: "Local tone mapping using the K-means algorithm and automatic gamma setting", IEEE Transactions on Consumer Electronics, IEEE Service Center, New York, NY, US, vol. 57, No. 1, Feb. 1, 2011 (Feb. 1, 2011), pp. 209-217, XP011478021. Provided in IDS submitted on May 14, 2020.

Liu Mitsubishi Electric Research Labs (USA) S et al: "Bit-depth scalable coding for high dynamic range video", Visual Communications and Image Processing; Jan. 29, 2008-Jan. 31, 2008; San Jose Jan. 29, 2008 (Jan. 29, 2008), XP030081204. Provided in IDS submitted on May 14, 2020.

Korean Notice of Preliminary Rejection Re: Application No. 10-2018-7001892. Provided in IDS submitted on May 14, 2020.

\* cited by examiner

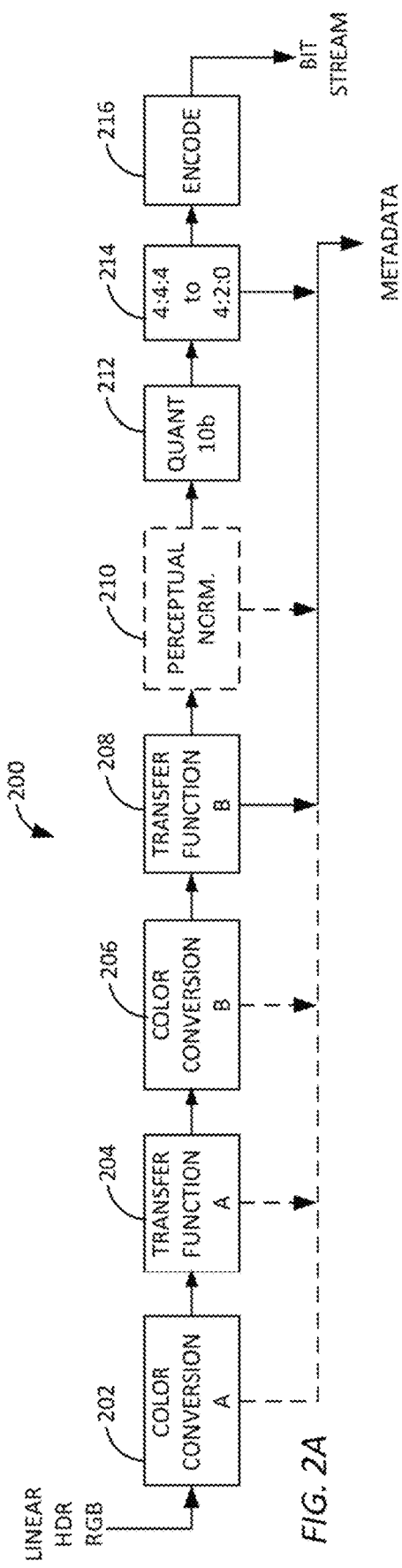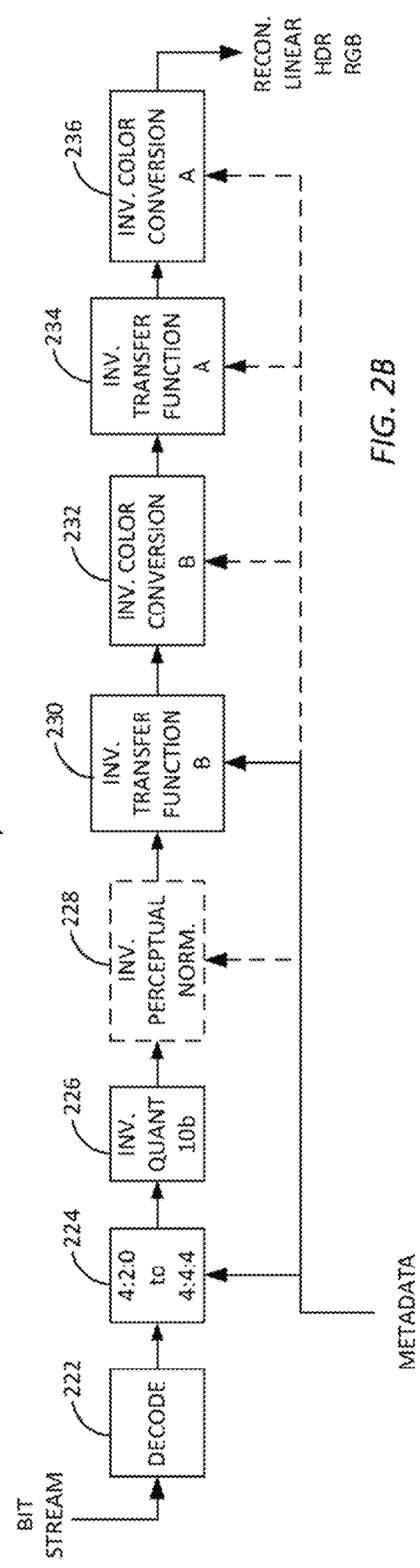

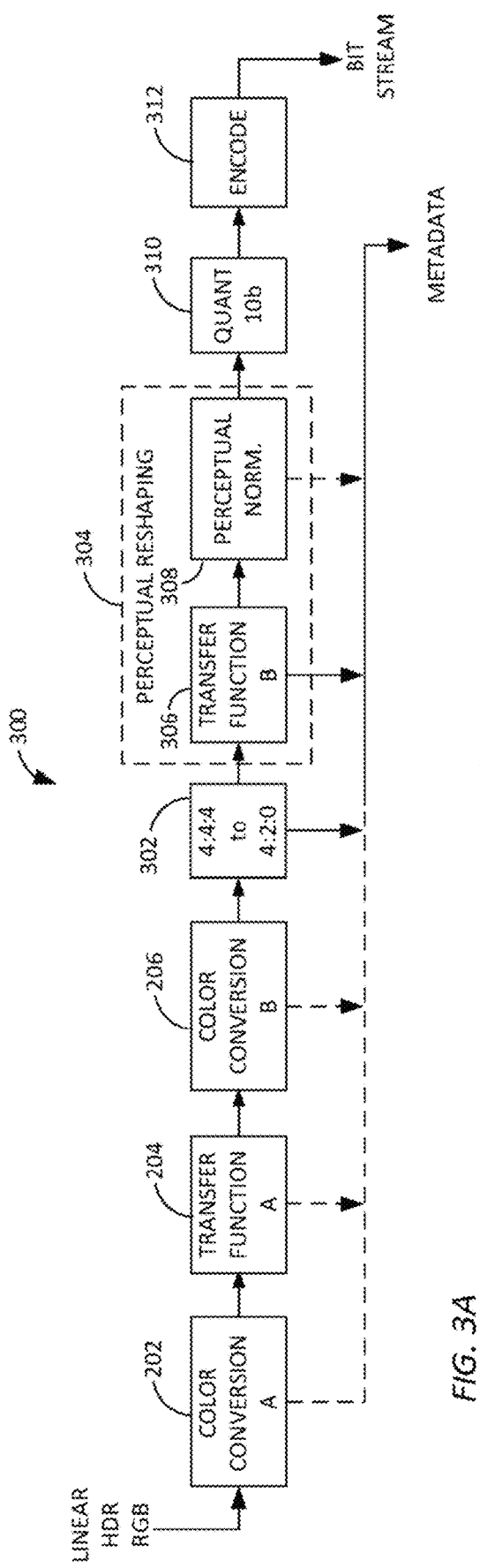
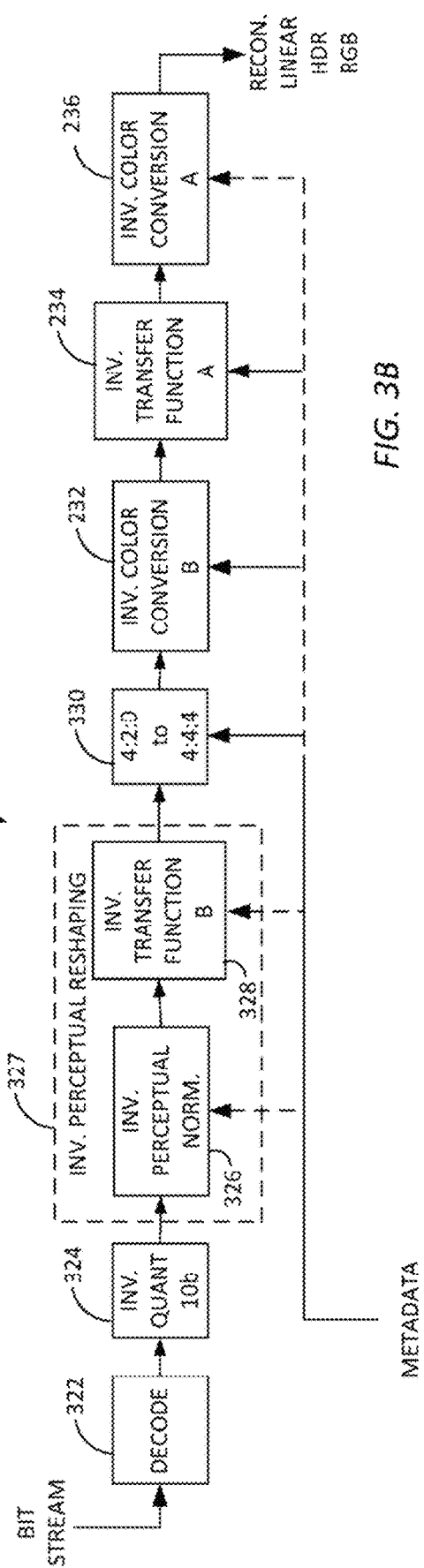
FIG. 3A
FIG. 3B

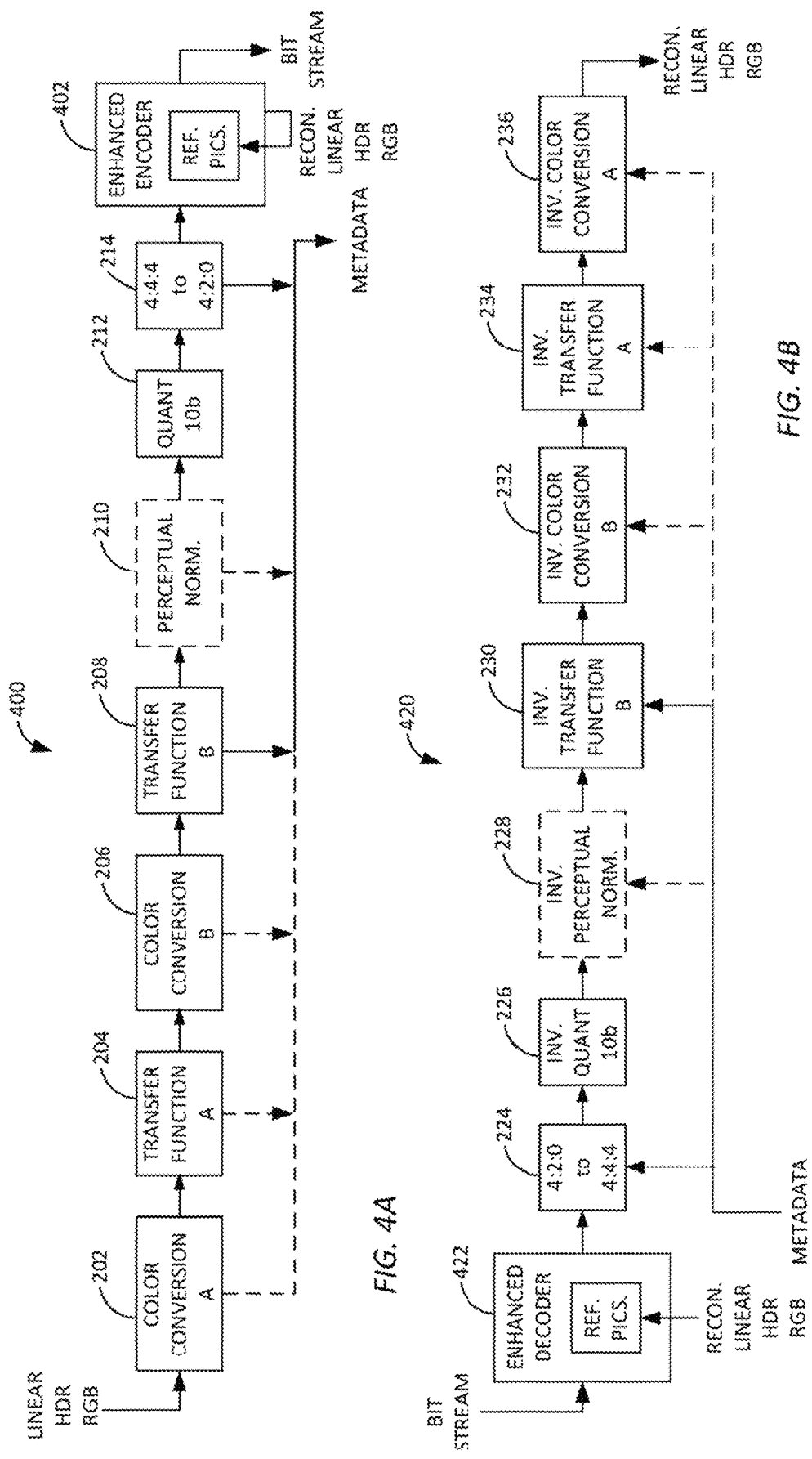

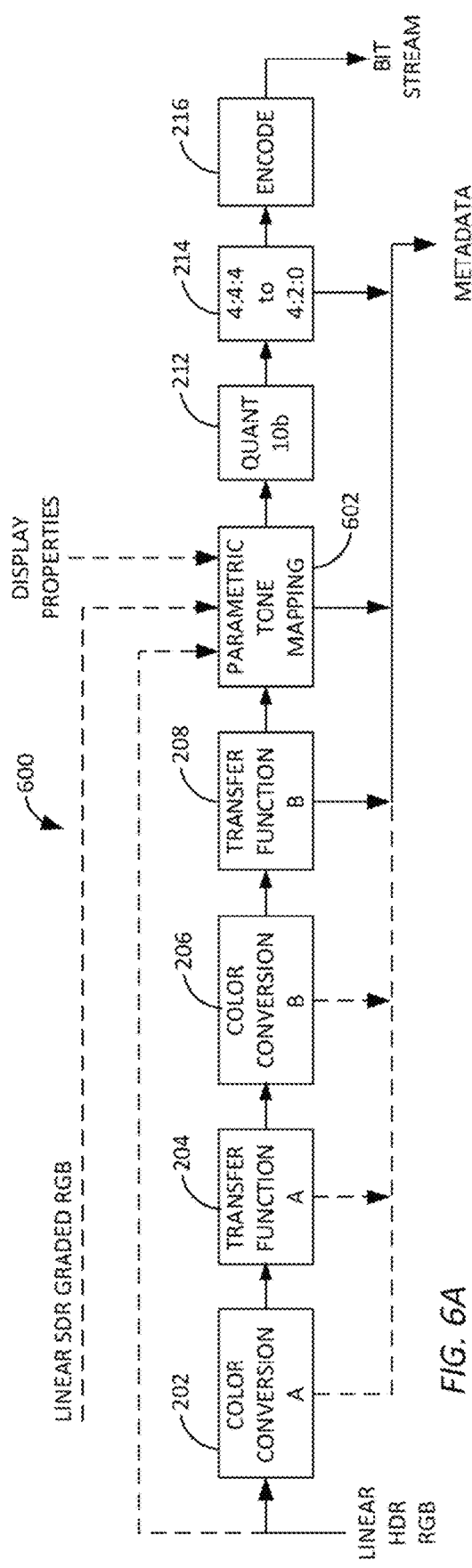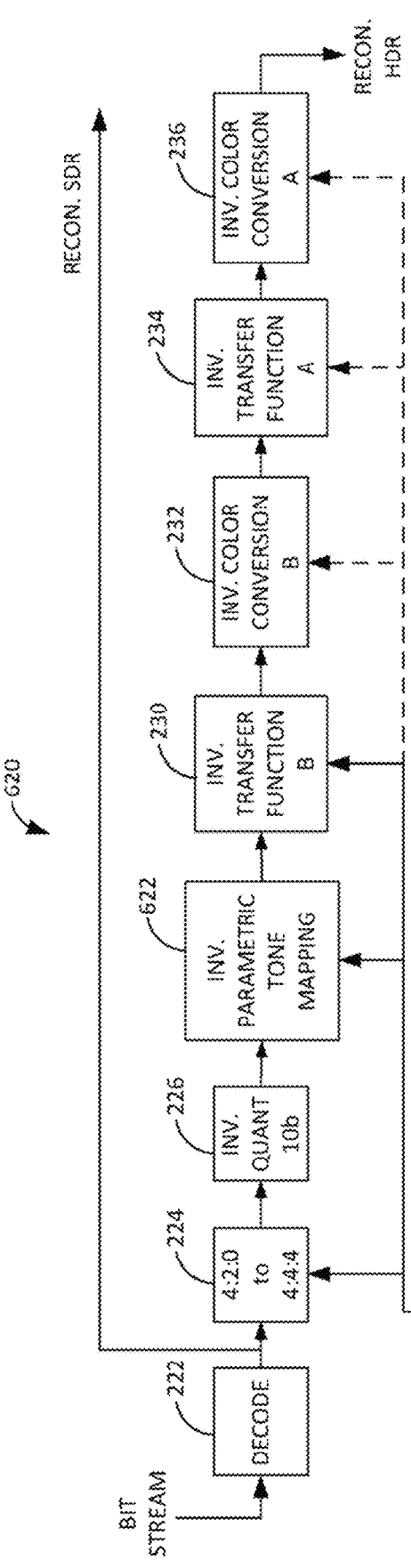

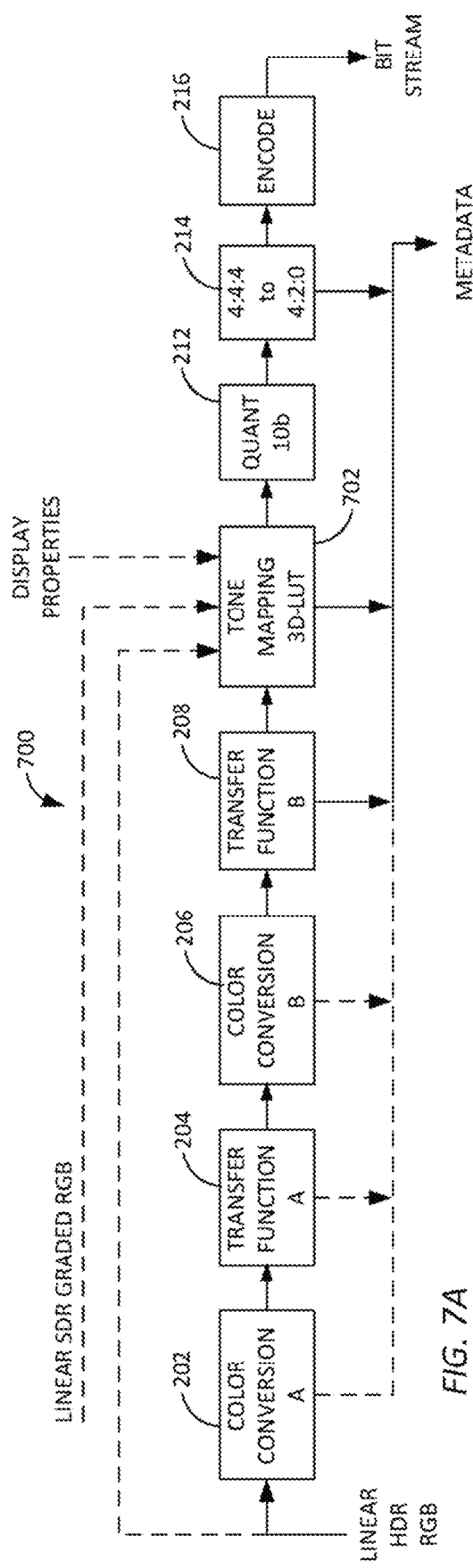
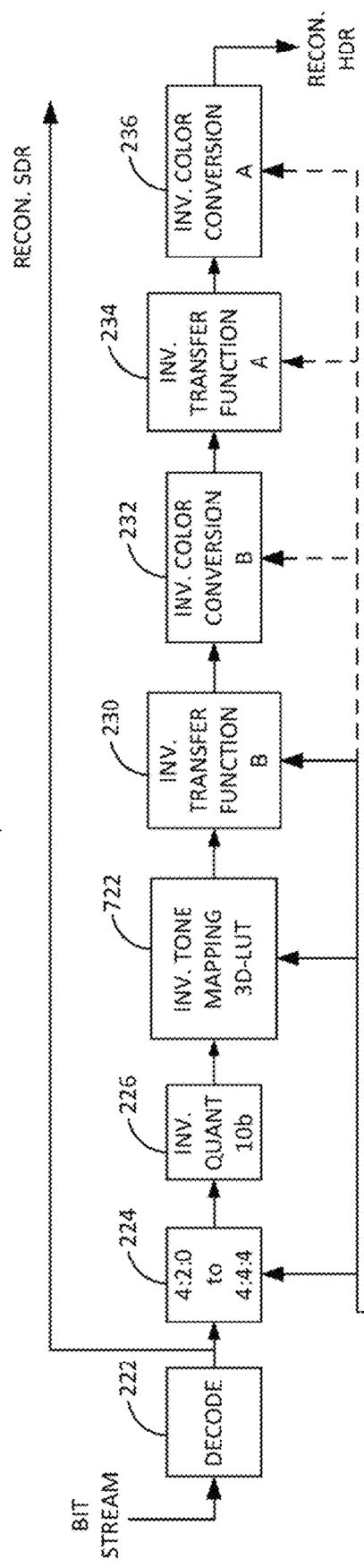
FIG. 7A
FIG. 7B

SYSTEM FOR CODING HIGH DYNAMIC RANGE AND WIDE COLOR GAMUT SEQUENCES

The present application is a continuation of U.S. patent application Ser. No. 15/217,046 filed on Jul. 22, 2016, which claims priority under 35 U.S.C. § 119(e) from earlier filed U.S. Provisional Application Ser. No. 62/195,432, filed Jul. 22, 2015, both of which are hereby incorporated by reference.

TECHNICAL FIELD

The present disclosure relates to the field of video encoding and decoding High Dynamic Range (HDR) and/or Wide Color Gamut (WCG) video sequences, particularly a method of adaptively transforming linear input values into non-linear values that can be encoded and decoded, based on content characteristics of an input video sequence.

BACKGROUND

HDR video and WCG video provide greater ranges of luminance and color values than traditional Standard Dynamic Range (SDR) video. For example, traditional video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

However, many common video encoding and decoding schemes, such as MPEG-4 Advanced Video Coding (AVC) and High Efficiency Video Coding (HEVC), are not designed to directly handle HDR or WCG video. As such, HDR and WCG video information normally must be converted into other formats before it can be encoded using a video compression algorithm.

For example, HDR video formats such as the EXR file format describe colors in the Red, Green, Blue (RGB) color space with 16-bit half-precision floating point values having 10 significant bits, 5 exponent bits and one sign bit. These values cover a broad range of potential intensity and color values. SDR video employs 8 or 10-bit values to express the colors of non-HDR and non WCG video. Many existing video compression algorithms are meant for use with SDR video and, thus, expect to receive 8 or 10-bit values. It is difficult to quantize the 16-bit half-precision floating point color values into 10-bit values that the compression algorithms can work with without substantially reducing video resolution or introducing significant distortion.

Some encoders use a coding transfer function to convert linear values from the input video into non-linear values prior to uniform quantization. By way of a non-limiting example, a coding transfer function may include a gamma function that compresses color values at one or both ends of the quantization range so that a larger range may be represented by the 8 or 10 bit values provided to the encoder. However, even when an encoder uses a coding transfer function to convert linear input values into non-linear values, the coding transfer function may be fixed, such that it does not change dependent on the content of the input video. For example, an encoder's coding transfer function can be defined to statically map every possible input value in an HDR range, such as from 0 to 10,000 nits (candelas per square meter or $cd/m^2$), to specific non-linear values ranging from 0 to 255 for 8-bit values or 0 to 1023 for 10 bit values. When the input video contains input values in only a portion of that range, however, fixed mapping can lead to poor allocation of quantization levels resulting in quantization distortion in the reproduced image. For example, a picture primarily showing a blue sky can have many similar shades of blue, but those blue shades can occupy a small section of the overall range for which the coding transfer function is defined. As such, similar blue shades can be quantized into the same value. This quantization can often be perceived by viewers as contouring or banding, where quantized shades of blue extend in bands across the sky displayed on their screen instead of a more natural transitions between the shades.

Additionally, psychophysical studies of the human visual system have shown that a viewer's sensitivity to contrast levels at a particular location can be more dependent on the average brightness of surrounding locations than the actual levels at the location itself. Many coding transfer functions, however, do not take this into account and instead use fixed conversion functions or tables that do not take characteristics of the surrounding pixels, into account.

SUMMARY

The present disclosure describes methods of encoding digital video data which applies adaptive pre-processing to data representing high dynamic range (HDR) and/or wide color gamut (WCG) image data prior to encoding and complementary post-processing to the data after decoding in order to allow at least partial reproduction of the HDR and/or WCG data. The example methods apply one or more color space conversions, and a perceptual transfer function to the data prior to quantization. The example methods apply inverse perceptual transfer functions and inverse color space conversions after decoding to recover the HDR and/or WCG data. The transfer functions are adaptive so that different transfer functions may be applied to different video data sets including different groups of frames, individual frames or sub-components of a frame, such as processing windows. Information on the data set and information on the applied transfer function is passed as metadata from the encoder to the decoder.

BRIEF DESCRIPTION OF THE DRAWINGS

Further details of the present invention are explained with the help of the attached drawings in which:

FIGS. 2A and 2B depict a first example of a process for encoding an input HDR and/or WCG video sequence into a coded bit stream compatible with a non-HDR, non-WCG video encoder using up to two color volume conversion processes and two transfer functions, and decoding that coded bit stream into a decoded video with a complementary video decoder that uses inverse color volume conversion processes and transfer functions.

FIGS. 3A and 3B depict a second example of a process for encoding and decoding an input HDR and/or WCG video sequence using a non-HDR, non-WCG video encoder and decoder where the coding transfer function used by the encoder is combined with a perceptual normalization operation and the inverse coding transfer function used by the decoder is combined with an inverse perceptual normalization process.

FIGS. 4A and 4B depict a third example of an encoding and decoding process for an input HDR and/or WCG video sequence into a coded bit stream where the encoder and decoder use reference frames derived from the reconstructed HDR and/or WCG sequence.

FIGS. 6A and 6B depict a fifth example of encoding and decoding processes that employ parametric tone mapping processes after the coding transfer function and before quantization in the encoding stage and complementary inverse parametric tone mapping processes after the inverse quantization and before the inverse coding transfer function in the decoding stage.

FIGS. 7A and 7B depict a variation of the encoding and decoding processes shown in FIGS. 6A and 6B in which the tone mapping and inverse tone mapping processes are implemented using a three-dimensional (3D) look-up table.

DETAILED DESCRIPTION

The example systems and methods described below adapt the coding transfer function, or otherwise convert and/or redistribute HDR and/or WCG video data to effectively compress the HDR and/or WCG video so that it may be quantized and encoded by a non-HDR, non-WCG encoder such as an HEVC (High Efficiency Video Coding), H.264/MPEG-4 AVC (Advanced Video Coding), or MPEG-2 encoder and then reconstituted to recover at least some of the HDR and/or WCG data at the receiver. The transfer functions may be based on the actual video content at the level of a group of pictures, a picture, or a sub-picture window of the input video. These video processes may be achieved by generating curves or tone maps of non-linear values that represent the color and/or intensity information actually present in the input video data instead of across a full range of potential values. As such, when the non-linear values are uniformly quantized, the noise and/or distortion introduced by uniform quantization can be minimized such that it is unlikely to be perceived by a human viewer. In addition, metadata information about the processing performed to prepare the input video data for encoding is transmitted to decoders, such that the decoders can perform corresponding inverse operations when decoding the video data.

Figure 1:
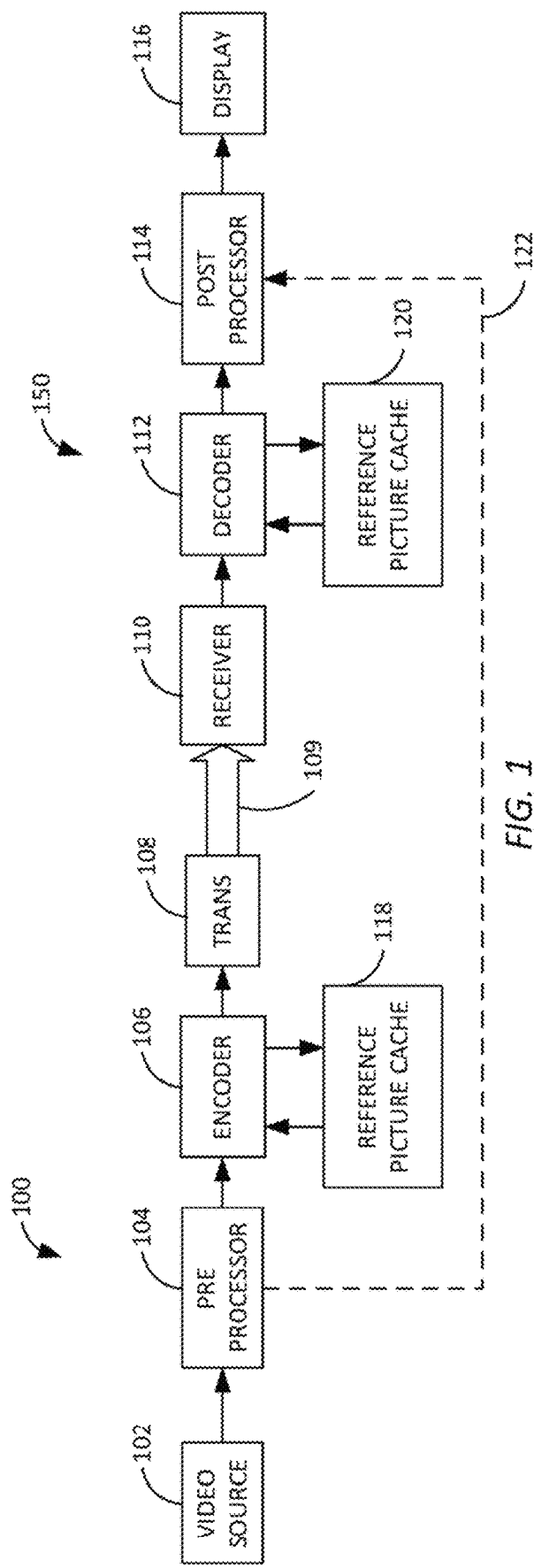
FIG. 1 depicts an embodiment of a video coding system comprising an encoder and a decoder.

FIG. 1 depicts an embodiment of a video coding system comprising an encoder system 100 and a decoder system 150. The encoder 100 system can comprise processors, (including digital signal processors (DSPs), or specialized video processors) memory, circuits, and/or other hardware and software elements configured to encode, transcode, and/or compress input video a coded bit stream 109. The encoder system 100 can be configured to generate the coded bit stream 109 according to a video coding format and/or compression scheme, such as HEVC (High Efficiency Video Coding), H.264/MPEG-4 AVC (Advanced Video Coding), or MPEG-2. By way of a non-limiting example, in some embodiments the encoder 100 can be a Main 10 HEVC encoder.

The example encoder system 100 receives HDR and/or WCG video data from a video source 102. The system 100 includes a preprocessor 104 that adaptively processes the HDR and/or WCG data so that it may be encoded using an encoder 106, for example a Main 10 HEVC encoder, based on reference pictures in a reference picture cache 118. The encoded data may be transmitted using the transmitter 108 as a bit stream 109 to a receiver 110 of the decoder system 150. The transmitter and receiver may use any transmission method including wired, wireless or optical connections. In one embodiment, the transmitter may format the encoded video data as Internet protocol (IP) packets and transmit the IP packets to the receiver 110 over a network. The network may be a digital cable television connection using Quadrature Amplitude Modulation (QAM), or other digital transmission mechanism. The network may be a wired cable network, an optical fiber network, or a wireless network. The network may be a private network or a global information network (e.g. the Internet). In addition to transmitting the encoded video data, the transmitter 100 transmits metadata 122 describing the processing performed by the preprocessor 104. Although the metadata 122 is shown as a separate signal, it may be included in the bit stream 109, for example, as supplemental enhancement information (SEI) or video usability information (VUI) data in the bit stream or in the headers of Groups of Picture (GOP), Pictures, Slices, macroblocks. The SEI or VUI may identify a rectangular processing windows defined by x and y coordinates of the input image data and particular metadata defining the processing performed by the encoder on the identified processing window.

The decoder system 150 can comprise processors, memory, circuits, and/or other hardware and software elements configured to receive the bit stream 109 at receiver 110 and to decode, transcode, and/or decompress the coded bit stream 109 into decoded HDR and/or WCG video for presentation on the display 116. The decoder system 150 can be configured to decode the coded bit stream 109 according to a video coding format and/or compression scheme, such as HEVC, H.264/MPEG-4 AVC, or MPEG-2. By way of a non-limiting example, in some embodiments the decoder 112 can be a Main 10 HEVC decoder. After the video data is decoded, it is processed by a post-processor 114 that, responsive to the metadata received from the encoder, inverts the processing performed by the preprocessor 104 to regenerate the HDR and/or WCG video data. The decoded HDR and/or WCG video data can be output to a display device for playback, such as playback on a television, monitor, or other display 116.

In some embodiments, the encoder system 100 and/or decoder system 150 can be a dedicated hardware devices. In other embodiments the encoder system 100 and/or decoder system 150 can be, or use, software programs running on other hardware such as servers, computers, or video processing devices. By way of a non-limiting example, an encoder system 100 can be a video encoder operated by a video service provider, while the decoder system 150 can be part of a set top box, such as a cable box, connected to a consumer television display.

The input video data provided by the video source 102 can comprise a sequence of pictures, also referred to as frames or an image essence or a video data set. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel.

The input video data can be an HDR video data set having one or more frame sequences with luminance and/or color values described in a high dynamic range (HDR) and/or on a wide color gamut (WCG). By way of a non-limiting example, a video with a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video can have a broader range of luminance and/or chrominance values than standard or non-HDR videos.

In some embodiments, the HDR input video data can have its colors indicated with RGB values in a high bit depth format, relative to non-HDR formats that express color values using lower bit depths such as 8 or 10 bits per color channel. By way of a non-limiting example, an HDR input video data can be in an EXR file format with RGB color values expressed in a linear light RGB domain using a 16 bit floating point value (having 10 significant bits, 5 exponent bits and one sign bit) for each color channel.

As shown in FIG. 2A, the encoder system 200 can apply, to the linear HDR RGB data, a first (intermediate) color conversion operation (color volume transform) 202, a first transfer function 204, a second (final) color conversion operation 206 a second (coding) transfer function 208, and an optional perceptual normalization operation 210 before quantizing the processed data to 10-bit values, down-sampling the chrominance information and encoding the resulting data using an existing encoder 216 such as a Main 10 HEVC encoder. The blocks 202, 204, 206, 208 and 210 implement a compression and perceptual mapping operation that converts the linear HDR RGB values from video source 202 onto values on a non-linear curve, based on one or more characteristics of the video's content.

By way of nonlimiting examples, the perceptual mapping operation can be tailored to the content of all or a portion of the video data set based on the minimum brightness, average brightness, peak brightness, maximum contrast ratio, a cumulative distribution function, and/or any other factor in the data set or the portion of the data set. In some embodiments, such characteristics can be found through a histogram or statistical analysis of color components or luminance components of the video at various stages of processing. In one example, the digital image data may be segmented into processing windows prior to applying the perceptual transfer function or perceptual tone mapping operation. One or more component (e.g. Y'CbCr) of each processing window may be analyzed to determine, for example minimum sample value, maximum sample value, average sample value, value, and maximum contrast (e.g. the difference between the minimum sample value and maximum sample value). These values may be calculated for a single component or for combinations of two or more components. These values are applied to the coding transfer function and perceptual normalizer or to a tone mapping process to determine the perceptual mapping to apply to the processing window.

The example perceptual mapping is configured to redistribute linear color information on a non-linear curve that is tailored to the content of the input video data on a global or local range in order to allow the HDR video data to be more efficiently encoded using the encoder 216 so that it may be decoded and reconstructed as HDR video data in the decoding system 220 shown in FIG. 2B. As described below converting the linear color values to other color spaces and applying non-linear curves based on the content of the input video can provide HDR and/or WCG detail in the reconstructed image while reducing the risk of distortion and/or noise being introduced through uniform quantization operations. In some embodiments, a greater number of bits and/or quantization levels can be allocated to ranges of intensities and hues that are present in a portion of a video frame and/or that are most likely to be perceived by a human viewer, while fewer bits and/or quantization levels can be allocated to intensities and hues that are not present in the color channels and/or are less likely to be perceived by viewers.

By way of a non-limiting example, when the input video data represents a scene in that takes place at night, its pictures can primarily include dark colors that are substantially bunched together in the RGB domain. In such a scene, lighter colors in the RGB domain can be absent or rare. In this situation the combined perceptual mapping can be adapted such that the chrominance and luminance values are redistributed on one or more non-linear curves that include the range of chrominance and luminance values actually present within the scene, while omitting or deemphasizing values that are not present within the scene. As such, formerly bunched-together dark chrominance and luminance values can be spread out substantially evenly on a curve of non-linear values (allocated a larger number of uniform quantization steps) while less common brighter values can be compressed together (allocated a smaller number of quantization steps) or even omitted if they are absent in the scene. As the dark values can be spread out on the curve, fine differences between them can be distinguished even when the values on the non-linear curve are uniformly quantized into discrete values or code words.

As described above, the perceptual mapping operation can be adaptive, such that it can change to apply different non-linear transfer functions depending on the content of the input video for a sequence of pictures, a single picture or a sub-picture window. Sub-picture processing allows different sub-areas of the same picture, such as processing windows, slices, macroblocks in AVC, or coding tree units (CTUs) in HEVC to be processed differently, based on their content. In other embodiments or situations, the perceptual mapping operations can be changed on a picture level for different pictures. In still other embodiments or situations, the perceptual mapping operation can be changed on a suprapicture level for different sequences of pictures, such as different Groups of Pictures (GOPs) or image essences. A perceptual mapping operation can be applied in any desired color space, such as the RGB, Y'CbCr, X'Y'Z' or I'PT color spaces. The content of video data representing a particular sequence of pictures, single picture or sub-picture element may be determined by generating a histogram of pixel values represented by the video data. For example, an image having both relatively dark and relatively bright areas may be segmented, for example, using a quad-tree algorithm, so that data from the dark areas are in one set of processing windows and data from the bright areas are in another set of windows. The perceptual mapping applied to the windows in the dark areas may be different than that applied in the bright areas, allowing detail in both areas to be maintained and displayed in the reproduced HDR image.

In one implementation, the perceptual normalization block 210 and/or the coding transfer function block 208 can apply a perceptual mapping transfer function to the Y'CbCr values provided by the color conversion block 206 to generate perceptually mapped Y'CbCr values. In some embodiments the perceptual mapping operation can use a 3D lookup table that maps Y'CbCr values to associated perceptually mapped Y'CbCr values. In other embodiments, the perceptual mapping operation can use one or more formulas to convert each color component. By way of a non-limiting example, the perceptual mapping operation can convert values using formulas such as: Y'_PM=f(Y', Cb, Cr) Cb_PM=g(Y', Cb, Cr) Cr_PM=h(Y', Cb, Cr) In this example, the functions can each take the three Y'CbCr values as inputs and output a perceptually mapped Y'CbCr values.

As shown in FIG. 2A, the encoder 200 can receive HDR and/or WCG data as linear RGB values. The encoder 200 can perform the first color conversion operation 202. This operation transforms the linear RGB values into an intermediate linear color space, for example, LMS, XYZ or YCbCr. This transformation reduces the redundancy in the RGB data and puts the data in a format that is more conducive to compression. It is contemplated, however, that, depending on the format of the input data, block 202 may not perform any color conversion or may perform different color conversion operations on different portions of a video sequence including different portions of a single frame. The color conversion operation 202 may also produce metadata indicating either the conversion operation that was performed and on which portions of the sequence, frame or image it was performed. Instead of merely identifying the transformation, the metadata may include the matrix coefficients that represent the inverse of the color transformation operation applied by block 202. Instead of the metadata including the inverse coefficients, it is contemplated that it may include the coefficients that were used in the color volume conversion operation 202 and that the inverse coefficients may be generated in the decoder 220. The color conversion operation 202 may produce data in a color space that is easier to process by the first transfer function 204.

The transfer function 204 may be a gamma function that compresses bright and/or dark pixel values into a smaller range of values. Alternatively, it may be a perceptual transfer function, such as a perceptual quantization (PQ) transfer function. As another alternative, it may be an identity function that does not result in any transformation of the color converted video data. This function can be applied only to the luminance channel or to each channel and different functions may be applied to different portions of a video sequence and/or different frames or portions of frames in the sequence. For example, a gamma or PQ transfer function applied to the luminance channel in a relatively dark area of an image may result in a related operation being applied to the chrominance channel data in that image area. Block 204 also generates metadata describing the transform or the inverse of the transform that was applied and the portion of the image data to which it was applied. This metadata may include parameters that describe the transfer function or the inverse of transfer function. Data values for the complete transfer function or inverse transfer function may be interpolated from these values, for example, using linear interpolation or a quadratic or cubic spline curve fitting operation, to reconstruct the inverse transfer function or endpoints of linear segments that model the transfer function or inverse transfer function.

The color converted and transformed data from block 204 is then subject to a final color conversion operation in block 206. This color conversion operation may, for example, convert the video data to a color space such as I'PT or Y'CbCr that is more suitable for perceptual compression, especially for WCG image data. Block 206 may convert a sequence of images, single images, or portions of images into one or more color spaces that are easier to process for perceptual normalization and quantization. As with block 202, the color conversion performed by block 206 may be the identity function, resulting in no conversion. Alternatively, different color transformation operations may be performed on different portions of the video data. Furthermore, block 206 can generate metadata describing the color conversion that was performed and the portions of video data (supra-frames, frames or sub frames) to which it was applied. This metadata may simply identify the portion of the data and the conversion that was applied. Alternatively, instead of identifying the conversion, the metadata may include the coefficients of the 3×3 conversion matrix. As described above, the metadata may describe the color conversion that was performed by block 206 or its inverse.

After block 206, the twice color converted video data is subject to a second transfer function 208. Function 208 may be a coding transfer function that prepares the video data for quantization and coding by emphasizing video information that will be perceived as important by the human visual system and deemphasizing video information that will be perceived as unimportant. Transfer function 208 may be a function that conforms the data to human perception, for example, a Stevens' power law or Weber law transfer function with a gamma component that can be selected based on image content, intended maximum and minimum sample values, maximum brightness or luminance contrast and/or quantization step size in the portion of the video data to be processed. Transfer function 208 may adjust the image to account for contrast sensitivity of the luminance pixels and remap the corresponding chrominance samples based on the transformation applied to the luminance samples. This function may be applied to a sequence of frames, a single frame or a portion of a frame, such as a processing window. As with the other blocks in the preprocessing stage, the coding transfer function block 208 can generate metadata describing the transfer function that was applied, or its inverse, and the frames or portions of frames to which it was applied. This metadata may describe the transfer function parametrically or by a sequence of values. Parameters for the transfer function to be applied may be determined by analyzing the video data provided to the transfer function.

The video data may be divided into processing windows, for example, by applying a quadtree decomposition to the image data so that a specific set of tone mapping parameters can be indicated and applied to each leaf node of the quadtree. In this example, each leaf node of the quadtree decomposition can have a different tone mapping scheme. Alternatively, the processing windows can be specified as a regions to which tone mappings are applied to achieve a desired subjective target such as determined by a colorist. The region shape can be rectangular, circular, etc. where parameters of the shape, location, size, etc. can be specified. When identifying a processing window, it may be desirable to determine the maximum, average, and minimum values of each video component video data in the processing window and to supply these values to the transfer function block 208.

For example, the system may determine the minimum, average and maximum values by performing a histogram on the processing window that divides the image pixels into bins and selecting a set of contiguous bins that span some percentage (e.g. 80-95%) of the pixels in the processing window. The minimum data value may be the minimum value defined by the bin containing the smallest data values, the maximum data value may be the maximum value defined by the bin containing the largest data values, and the average value may be the mean of all values in all of the selected bins. Block 208 then adapts the coding transfer function and/or perceptual normalizer 210 to increase the number of quantization steps assigned between the minimum and maximum values while decreasing the number of quantization steps assigned to values less than the minimum or greater than the maximum. The adaptation is noted in the metadata which also includes data identifying the processing window. This metadata is sent to the decoder with the bit stream so that inverse perceptual normalization and inverse coding transfer functions may be applied to the data decoded from the bit stream. The metadata may include parameters describing the adapted transfer function or data values from which the transfer function may be reconstituted using interpolation.

While the identification of processing windows is described as being performed by the coding transfer function block 208, it is contemplated that it may be performed by other elements of the decoder. For example it may be performed by the video source 102 (shown in FIG. 1) or by the intermediate color conversion block 202. In addition to dividing individual frames into processing windows, the same algorithm may be used to group frames in the digital video data set by their common characteristics, and/or to identify characteristics of individual frames. It may be advantageous to identify portions of the digital video data set having common characteristics early in the encoding process so that both of the color conversion processes and the compression transfer function process may be tailored to the same portions.

After the coding transfer function 208, the data may be subject to perceptual normalization at block 210. This step adjusts the gain (scaling) and offset of the video data to make the perceptual compression of the video data more uniform across the group of frames and/or frame. Perceptual normalization may also compensate the chrominance samples for processing performed on the corresponding luminance samples to prepare the data in the color space for quantization. The gain and offset values or their inverses, as well as an identification of the portions of the image data to which they were applied, is provided as metadata. Perceptual normalization may not be used when the transfer functions 204 and 208 produce uniformly perceptually transformed data or when it is not important for the video data to be uniformly perceptually transformed.

In this example, which uses a Main 10 HEVC encoder, the normalized perceptually compressed data provided by the transfer function 208 and/or optional perceptual normalization process 210 are quantized to 10-bit values in the quantizer 212. If the output samples of the transfer function 208 and/or perceptual normalizer 210 are floating-point values, quantizer 212 may convert the pixel samples from floating-point to 10 bit fixed point values. If output samples are N-bit fixed-point values (N>10) the quantizer may select the 10 most significant bits (MSBs) of the N-bit samples or round these values based on the $11^{th}$ bit. Because of the preprocessing performed by blocks 202, 204, 206, 208 and 210, more perceptually significant image data receives a greater number of quantization levels than less perceptually significant data. It is contemplated that the quantizer 212 may employ scalar or vector quantization for the color components.

Next, block 214 down-samples the chrominance information to convert the 4:4:4 pixels into 4:2:0 pixels. The reduction of resolution of the chrominance samples is not noticeable to the human visual system which perceives colors at lower spatial resolution than luminance. Metadata defining the processing performed to downsample the chrominance information is added to the metadata from the downsampling block 214 of the encoder. This metadata, for example, may describe the kernel of a two-dimensional spatial filter that was used to generate the down-sampled data or an inverse filter that generates spatially upsampled data from the downsampled data. The metadata may also specify any phase shift offsets in the subsampling operations. The encoder 216 then encodes the pre-processed, quantized and down-sampled data to produce an output bit stream. In one implementation, the metadata is encoded with the bit stream as supplemental enhancement information (SEI) or video usability information (VUI) data. Although block 214 is shown as converting 4:4:4 pixels to 4:2:0 pixels, it is contemplated that other conversions could be performed, for example converting the 4:4:4 pixels to 4:2:2 or 4:1:1 pixel formats. If any of these alternate downsampled formats is generated by block 214, corresponding upsampling—would be performed by the corresponding block in the decoding system.

The decoding system 220 shown in FIG. 2B receives the bit stream at decoder 222. The example Main 10 HEVC decoder 222, extracts the metadata, and reverses the encoding operation performed by the encoder 216 to produce 10-bit video data in a 4:2:0 pixel format. The metadata produced by the chrominance downsampler 214 is applied to an upsampler 224 that reconstructs 4:4:4 pixel format samples from the 4:2:0 samples, for example by applying the 4:2:0 samples to a spatial interpolation filter. These samples are provided to an inverse quantizer 226 that convert the 4:4:4 pixel samples to floating point values or may add zero-valued less significant bits to higher precision fixed-point samples. The operations performed by the inverse quantizer 226 tend to reverse the quantization operations performed by the quantizer 212.

Block 228, based on the metadata received from the perceptual normalization block 210, attenuates and offsets samples in the identified video data sets to reverse the gain and offset adjustments performed by the perceptual normalization filter 210. Similarly, block 230 applies a transfer function that is the inverse of the coding transfer function 208. This may be an inverse Stevens' law or an inverse Weber law transfer function generated from parameters in the metadata or it may be a transfer function regenerated from values in the metadata that represent either samples of the applied filter characteristic or line segments of a linearized characteristic.

Similarly, blocks 232, 234 and 236 of decoder 220 respectively invert the final color conversion operation performed by block 206, the first transfer function performed by block 204 and the intermediate color conversion operation performed by block 202 of the encoder 200. These operations are performed only on the data sets representing the regions of the frame or frames associated with the color conversion operations and transfer functions in the metadata. The output data provided by the inverse color conversion block 236 is a reconstructed linear HDR RGB signal. Perceptually important data such as detail and texture in dark portions of the images and color values in both the dark and bright portions of the images are preserved in the reconstructed data while less perceptually important data may be lost. Although the systems shown in FIGS. 2A and 2B as well as the systems shown in the other FIGs. below are shown as receiving and reconstructing linear HDR RGB data, it is contemplated that they may receive and reconstruct other HDR and/or WCG data.

FIGS. 3A and 3B describe a variant of the encoding and decoding systems shown in FIGS. 2A and 2B. Many of the blocks shown in FIGS. 3A and 3B are the same as the blocks in FIGS. 2A and 2B that have the same numbers. For the sake of brevity, the operation of these blocks is not separately described herein. One difference between FIGS. 2A and 2B on the one hand and FIGS. 3A and 3B on the other hand is the perceptual reshaping block 304 and the corresponding inverse perceptual reshaping block 327 shown in FIG. 3B. Block 304 combines the coding transfer function 306 with the perceptual normalization operation 308 and, similarly, block 327 combines the inverse perceptual normalization operation 326 and the inverse coding transfer function block 328.

Another difference between the systems 200 and 220 shown in FIGS. 2A and 2B relative to the respective systems 300 and 320 shown in FIGS. 3A and 3B is the locations of the chrominance downsampling process 302 and the chrominance upsampling process 330 in the processing stream. In FIG. 3A the downsampling process 302 operates on the data provided by the final color conversion process 206. Similarly, in FIG. 3B, the upsampled output values provided by the upsampling process 330 are applied to the inverse color conversion process 232, which is the inverse of the process 206. The relocation of the downsampling and upsampling processes results in the perceptual reshaping processing being performed on pixels having downsampled chrominance values. This modification may result in less processing as fewer chrominance samples are processed by blocks 306, 308, 310 shown in FIG. 3A and blocks 324, 326 and 328 shown in FIG. 3B than are processed by the corresponding blocks 208, 210 and 212 shown in FIG. 2A and blocks 226, 228 and 230 shown in FIG. 2B. As described above, because further processing reduction may be achieved by including the offset and gain adjustments performed by the perceptual normalization process 308 with the coding transfer function 306 and including the inverse offset and gain adjustments performed by the inverse perceptual normalization process 326 with the inverse coding transfer function 328.

The encoding systems 400 and 420 shown in FIGS. 4A and 4B represent another variant of the respective systems 200 and 220 shown in FIGS. 2A and 2B. Like numbered elements in FIGS. 4A and 4B and FIGS. 2A and 2B operate in the same way and, for the sake of brevity are not separately described herein. The processes shown in FIGS. 4A and 4B differ from the processes of FIGS. 2A and 2B in the content of the reference pictures used by the encoder 402 and decoder 422. As described above with reference to FIG. 1, the Main 10 HEVC decoder performs predictive encoding and decoding in which pixel values from a current frame are subtracted from corresponding pixel values generated from one or more of the reference frames. These difference values typically have much less information than the full pixel value and, thus, are more efficiently frequency-transformed and quantized in the encoder. As shown in FIG. 1, the reference frames in the reference picture cache 118 are generated by the encoder 106 which decodes the encoded data it generates. This is done so that the difference values may compensate for losses or distortion introduced by the encoding prediction processes.

If a standard Main 10 HEVC decoder is used in the processes shown in FIGS. 2A and 2B, the reference pictures may not accurately represent the decoded versions of the encoded pictures because they do not include the post processing steps performed by the decoder shown in FIG. 2B. The systems 400 and 420 shown in FIGS. 4A and 4B address this by enhancing the encoder 402 and decoder 422. The encoder 402 is enhanced to generate the reference pictures by post processing the internally decoded pictures in the same way as the processes 224, 226, 228, 230, 232, 234 and 236 to regenerate the reconstructed linear HDR RGB images and then processing the reconstructed images in the same way as processes 202, 204, 206, 208, 210, 212 and 214 for the current image. The result is a set of reference frames that can be used by the Main 10 HEVC encoder to more accurately perform predictive coding. Because the preprocessing and post processing processes are complementary, some post processing processes may be eliminated as long as the corresponding preprocessing process is also eliminated. For example, the enhanced encoder may not perform the color conversion from LMS or XYZ to linear HDR RGB and, also may not perform the complementary preprocessing operation to convert the linear HDR RGB data to the LMS or XYZ color space.

The enhanced decoder 422 does not perform both the post-processing and the pre-processing because blocks 224, 226, 228, 230, 232, 234 and 236 of the decoder already perform the post-processing steps. Thus, in the system 420 shown in FIG. 4B, the reconstructed linear HDR RGB data produced by the inverse color converter 236 is applied to the decoder 422 which processes it in the same way as the preprocessing blocks 202, 204, 206, 208, 210, 212 and 214 for the current image to generate the reference images. As described above, some of these preprocessing operations may be eliminated if the image data for the reconstructed images is taken from a different point in the decoding system 420. For example, if data for the reference images is taken from the output of inverse transfer function 234, the pre-processing operation to convert the data from the linear HDR RGB color space to the XYZ or LMS color space would not be needed.

The focus of the example implementations described above is to encode and decode a signal that allows for the regeneration of a HDR and/or WCG signal using an encoder and decoder that are designed to handle video signals having lower dynamic range and/or a narrower color gamut for example, standard dynamic range (SDR) video data. The data produced by the decoder 222 in FIG. 2B, however, may not be suitable for display on a monitor compatible with the decoder because it may include data that has been perceptually processed to increase or decrease its quantization resolution.

The example systems shown in FIGS. 5A, 5B, 6A, 6B, 7A, 7B, 8A and 8B include processes that allow video data having a lower dynamic range and/or a narrower color gamut (e.g. SDR data) to be generated along with the reconstructed HDR and/or WCG video data. These systems utilize tone mapping to generate the SDR images. Tone mapping reduces the dynamic range, or contrast ratio, of an entire image or portions of the image while retaining localized contrast. It may also reduce the color gamut by mapping colors that cannot be represented in the SDR image into the color space of the SDR image. The tone mapping may also be performed to subjectively match aesthetics of the SDR image with the HDR image.

Figures 5A, 5B:
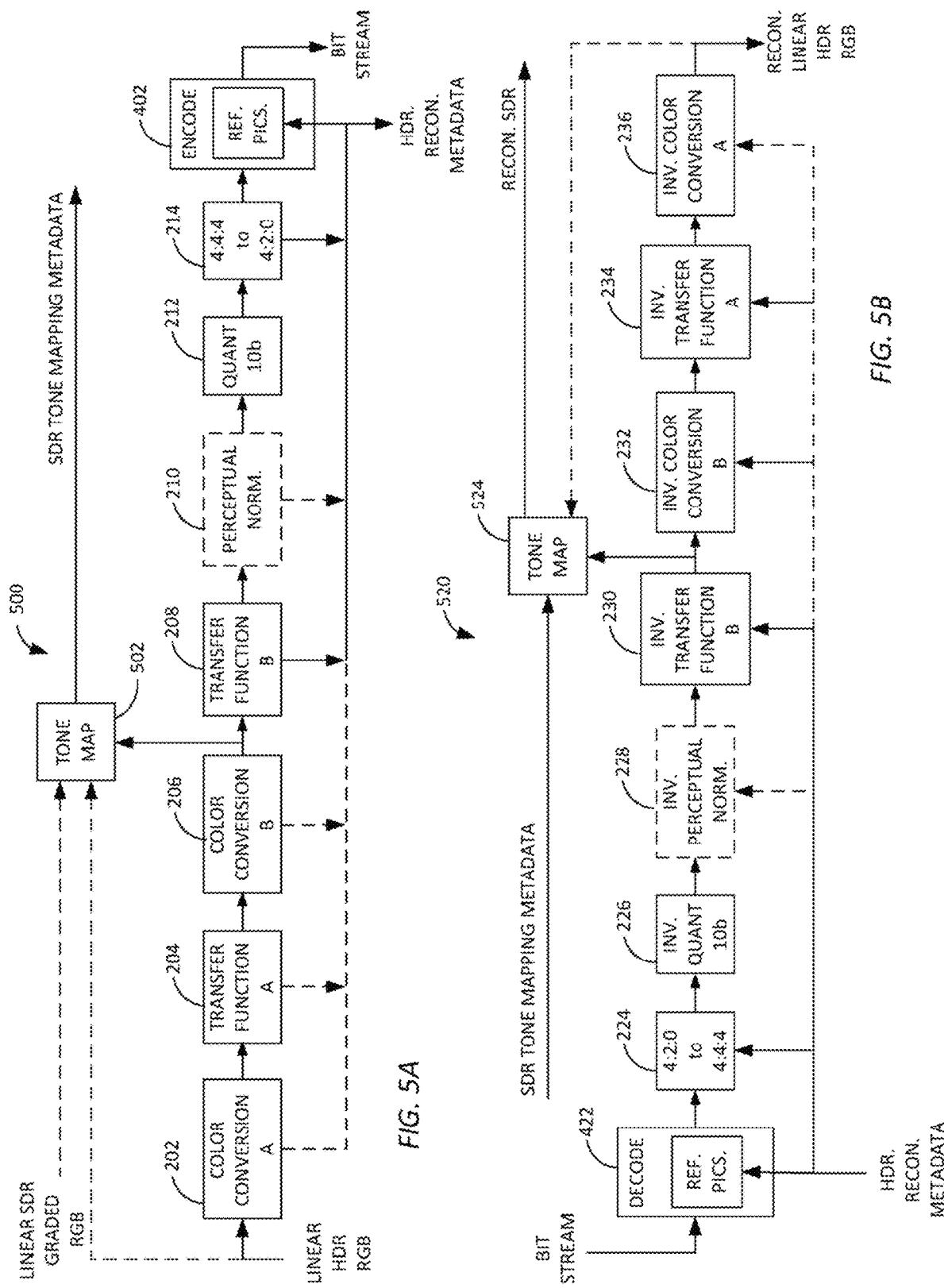
FIGS. 5A and 5B depict a fourth example of encoding and decoding processes that use SDR video data at the encoder, where the processes use a tone map generated from a linear SDR graded RGB image to concurrently produce SDR and HDR image data at the decoder.

FIG. 5A shows an encoder 500 that processes the HDR image to produce an SDR compatible image. The blocks in FIG. 5A that have the same numbers as in the blocks in system 400 shown in FIG. 4A operate in the same way and are not described herein in detail. It is contemplated, however, that the encoder 216 in FIG. 2A may be substituted for the encoder 402 in FIG. 5A to modify the implementation of the encoder 200 shown in FIG. 2A to use a tone map. In one implementation, the image data produced by the color conversion process 206 which, in this implementation converts the video data to the Y'CbCr color space, is applied to a tone map 502. In this implementation, it is assumed that the transfer function of block 204 is applied to entire images of the input image sequence to generate the non-linear Y' data. In other words, all sub-components of each image are processed equally. The image data used to generate the tone map is acquired prior to the perceptual modifications performed by the coding transfer function block 208 and perceptual normalization block 210 as these blocks adjust the image data in ways that would be more difficult to process using the tone map. The tone map 502 identifies high contrast elements in the video data and generates tone-map values to reduce the contrast of these elements to produce a suitable SDR image. This SDR tone mapping data is transmitted to the decoder 520 as a part of the metadata. In another implementation, linear SDR graded RGB image data is available from the video source 102 (shown in FIG. 1). In this instance, both the linear HDR RGB image data and the linear SDR graded RGB image data are applied to the tone map process 502. The tone map process may generate a tone map by analyzing differences between corresponding image data in the two data sets. The SDR tone mapping data is then converted to the Y'CbCr color space. Alternatively, the tone map process 502 may convert the linear HDR RGB data and the linear SDR graded RGB data to the Y'CbCr color space prior to comparing the image data sets. The generated tone map may be a set of transfer functions, one each for the Y', Cb and Cr channels that adjust values of the Y'CbCr data produced by the color conversion block 206 to match corresponding values from the converted linear SDR graded RGB data.

FIG. 5B shows how the SDR image is recovered at the decoder 520. As with FIG. 5A, blocks having the same numbers as in the system 420 shown in FIG. 4B operate in the same way and are not described herein in detail. It is contemplated, however, that the decoder 222 in FIG. 2B may be substituted for the decoder 422 shown in FIG. 5B to modify the implementation shown in FIG. 2B to use an inverse tone map. The tone map in the decoder 520 is applied to the data produced by inverse coding transfer function 230 to produce the reconstructed SDR data. As shown, the tone map may also employ the reconstructed linear HDR RGB signal to determine the modifications to the Y'CbCr signal to be provided by the inverse transfer function 230. For easier processing, it may be desirable for the block 524 to convert the reconstructed linear HDR RGB data to the Y'CbCr color space before applying it to the tone mapping function.

FIGS. 6A and 6B illustrate another implementation by which the combined encoding system 600 and decoding system 620 may produce a backwards compatible SDR signal. As with the previous implementations, blocks having the same numbers as in the system 200 shown in FIG. 2A operate in the same way and are not described herein in detail. The systems shown in FIGS. 6A and 6B perform all of the steps of the systems shown in FIGS. 2A and 2B except that the optional perceptual normalization block 210 is replaced by a parametric tone mapping block 602 which applies a tone mapping that maps the pixel data in the Y'CbCr color space to be compatible with SDR image data. When the output data provided by the parametric tone mapping block 602 is quantized by the quantizer 212 and down-sampled by the downsampling block 214, the result is an SDR signal that can be displayed on an SDR monitor.

The parametric tone mapping block 602 may implement static tone mapping, for example from HDR Y'CbCr to SDR Y'CbCr. Alternatively, the tone mapping block 602 may take into account the properties of the display device (or type of display device, e.g. OLED, LED or plasma) on which the SDR data is to be displayed and apply a static tone map that is specific to the display device. As another alternative, the tone map may be dynamically generated using the linear HDR RGB data and the SDR graded RGB image data provided by video source 102 (shown in FIG. 1) and using the properties of the display device. As described above, before generating the tone mapping functions, it may be desirable to convert the HDR and SDR RGB data to Y'CbCr data by applying a compression transfer function similar to that performed by block 204 and a color conversion operation similar to that performed by block 206.

There may be separate tone mapping functions for each of the components of the Y'CbCr data, similar to the parametric conversion functions f( ), g( ) and h( ) described above with reference to FIG. 2A. These functions may be defined by first identifying how specific corresponding pixel values are mapped from the HDR to SDR color spaces to define points of the functions and then fitting a curve to the points or defining a set of line segments between adjacent points that approximate the functions. These points may be selected, for example, to span the luminance and chrominance values of the HDR and SDR color spaces. The coefficients defining the equations and/or line segments are the parameters that define the tone map and that are sent to the decoder 620 as a part of the metadata.

The decoder 222 of the system 620 decodes the bit stream to produce reconstructed SDR data. This data is then upsampled in block 224 and inverse quantized in block 226 to produce the data that is applied to the inverse parametric tone mapping block 622. Block 622 performs the inverse of the parametric tone mapping block 602 to map the Y'CrCb data in the SDR color space to corresponding data in the Y'CrCb data in the HDR color space. The remaining blocks in the decoding system 620 operate in the same way as the corresponding blocks in FIG. 2B and, for the sake of brevity are not separately described herein.

Figure 8A:
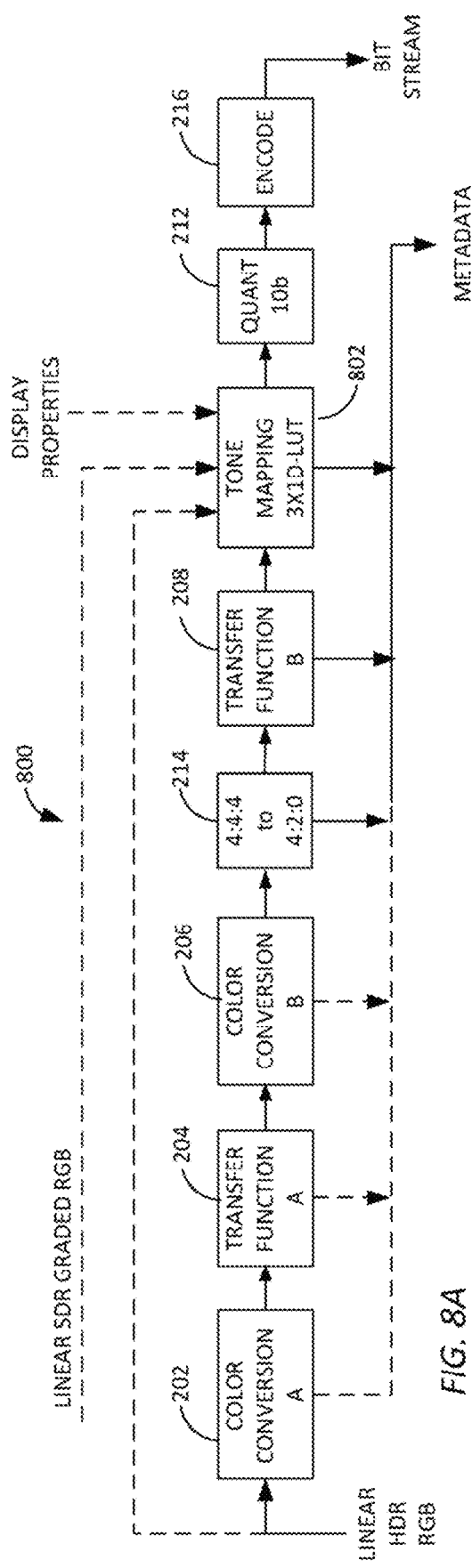
FIGS. 8A and 8B depict a variation of the encoding and decoding processes shown in FIGS. 6A and 6B in which the tone mapping and inverse tone mapping processes are implemented using three one-dimensional (1D) look-up tables.
Figure 8B:
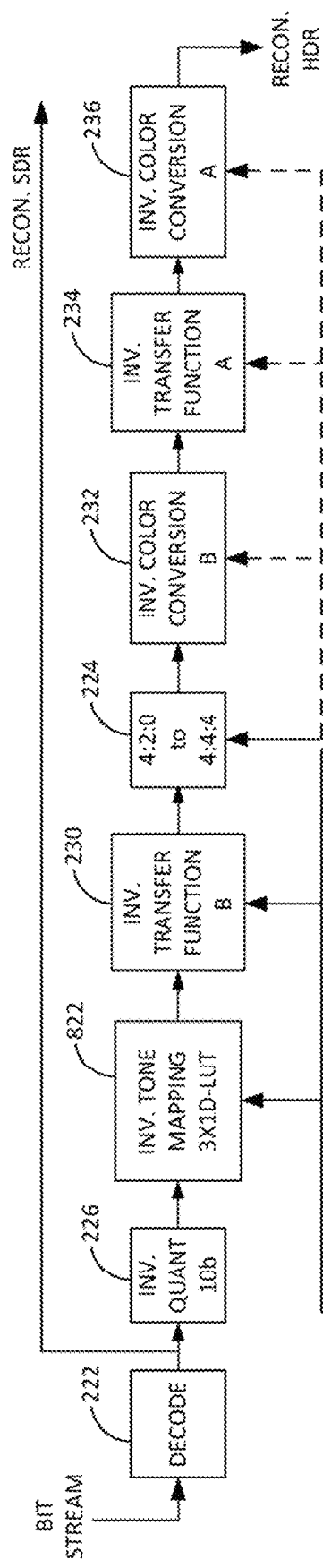

FIGS. 7A and 7B show an encoding system 700 and decoding system 720 that are the same as the systems 600 and 620 shown in FIGS. 6A and 6B except that the parametric tone mapping blocks 602 and 622 of FIGS. 6A and 6B are replaced by 3D look-up tables (LUTs) 702 and 722 in FIGS. 7A and 7B. The 3D LUT used in system 700 shown in FIG. 7A may implement the functions Y'_PM=f(Y', Cb, Cr), Cb_PM=g(Y', Cb, Cr), Cr_PM=h(Y', Cb, Cr) as described above with reference to FIG. 2. Thus, each output value Y'_PM, Cb_PM and Cr_PM is a function of all three values Y', Cb and Cr of the input pixels. Similarly, FIGS. 8A and 8B show an encoding system 800 and decoding system 820 that are the same as the systems 600 and 620 shown in FIGS. 6A and 6B except that the parametric tone mapping blocks 602 and 622 of FIGS. 6A and 6B are replaced by 3×1D look-up tables (LUTs) 802 and 822 in FIGS. 8A and 8B. In addition, in FIG. 8A, chrominance down sampling 214 occurs immediately after the color conversion 206 and in FIG. 8B chrominance upsampling occurs immediately before inverse color conversion 232. Thus, in these systems, the tone mapping and inverse tone mapping is applied to video data in a 4:2:0 format. In the three 1D tone maps shown in FIGS. 8A and 8B, each transformed output value is a function of only its untransformed input value thus, Y'_PM=f(Y'), Cb_PM=g(Cb), Cr_PM=h(Cr).

Figure 9:
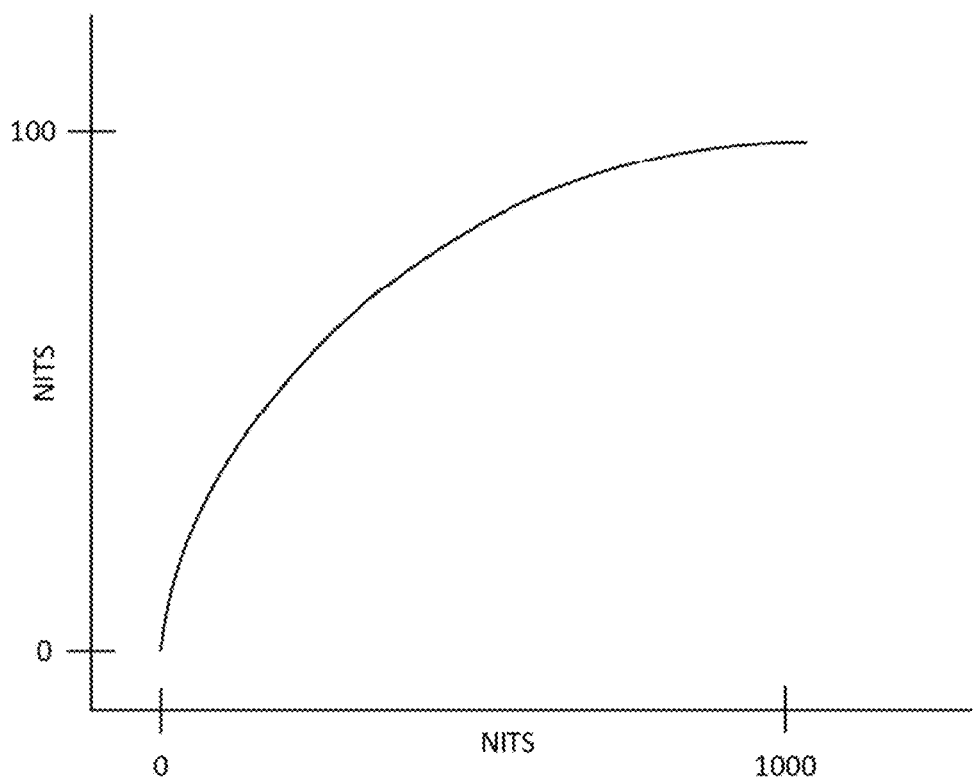
FIG. 9 depicts an example plot of a gamma compression transfer function.
Figure 10:
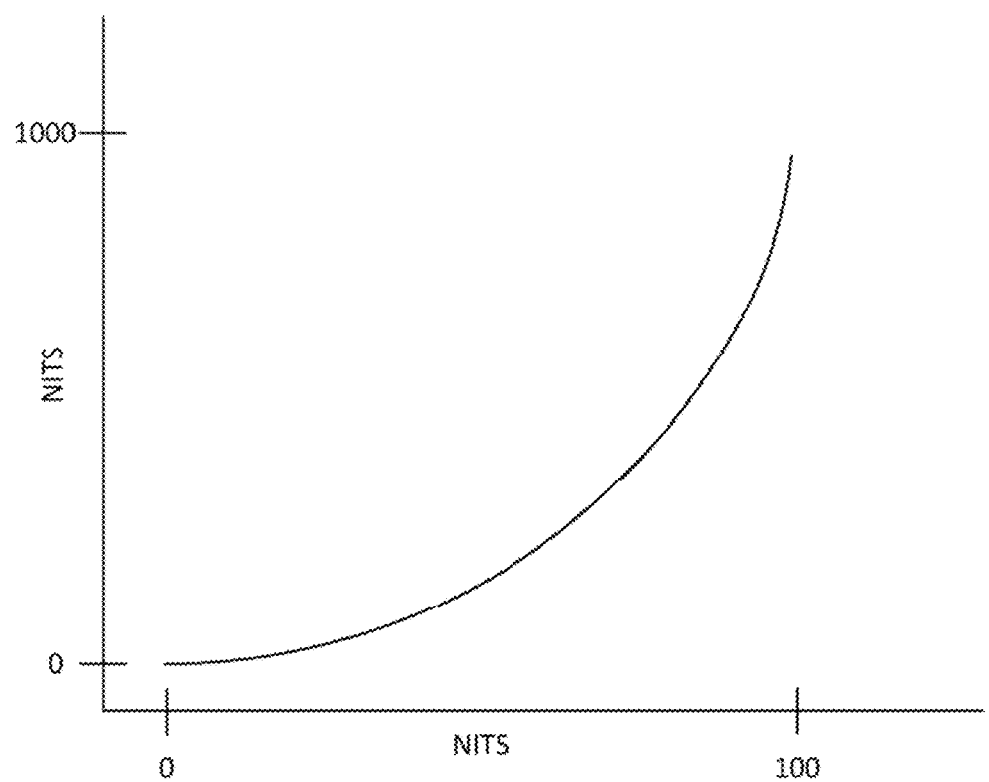
FIG. 10 depicts an example plot of a gamma decompression transfer function.

As described above with reference to FIG. 2A, the transfer function applied by block 204 compresses the video data to make it more suitable for encoding. This transfer function may be a gamma compression function such as the graph shown in FIG. 9 which translates the XYZ or LMS input data to X'Y'Z' or L'M'S' data, that spans 1000 nits to output data spanning 100 nits. Block 234 reverses this compression and may have a transfer function such as the graph shown in FIG. 10. One such compression transfer function may be the perceptual quantization (PQ) transfer function.

By way of a nonlimiting example, in some embodiments the PQ transfer function can be a function that operates on Luminance values, L, with the function defined as:

$$PQ(L) = \left(\frac{c_1 + c_2 L^{m_1}}{1 + c_3 L^{m_1}}\right)^{m_2}$$

In this example, parameters that can be sent from the encoder 200 to the decoder 220 at each sub-picture level, picture level, or supra-picture level include one or more of: $m_1$, $m_2$, $c_1$, $c_2$, and $c_3$. For instance, in one non-limiting example implementation, the values of the parameters can be as follows:

$m_1$=0.159302
$m_2$=78.84375
$c_1$=0.835938
$c_2$=18.85156
$c_3$=18.68750

In some embodiments or situations, the values of one or more of these parameters can be predetermined, such that they are known to both the encoder 200 and decoder 220. As such, the encoder 200 can send less than all of the parameters to the decoder 220 to adjust the PQ curve. By way of a non-limiting example, all the parameters except for $m_2$ can be preset, such that the encoder 200 only sends the value of $m_2$ it used at each coding level to the decoder 220.

Figure 11:
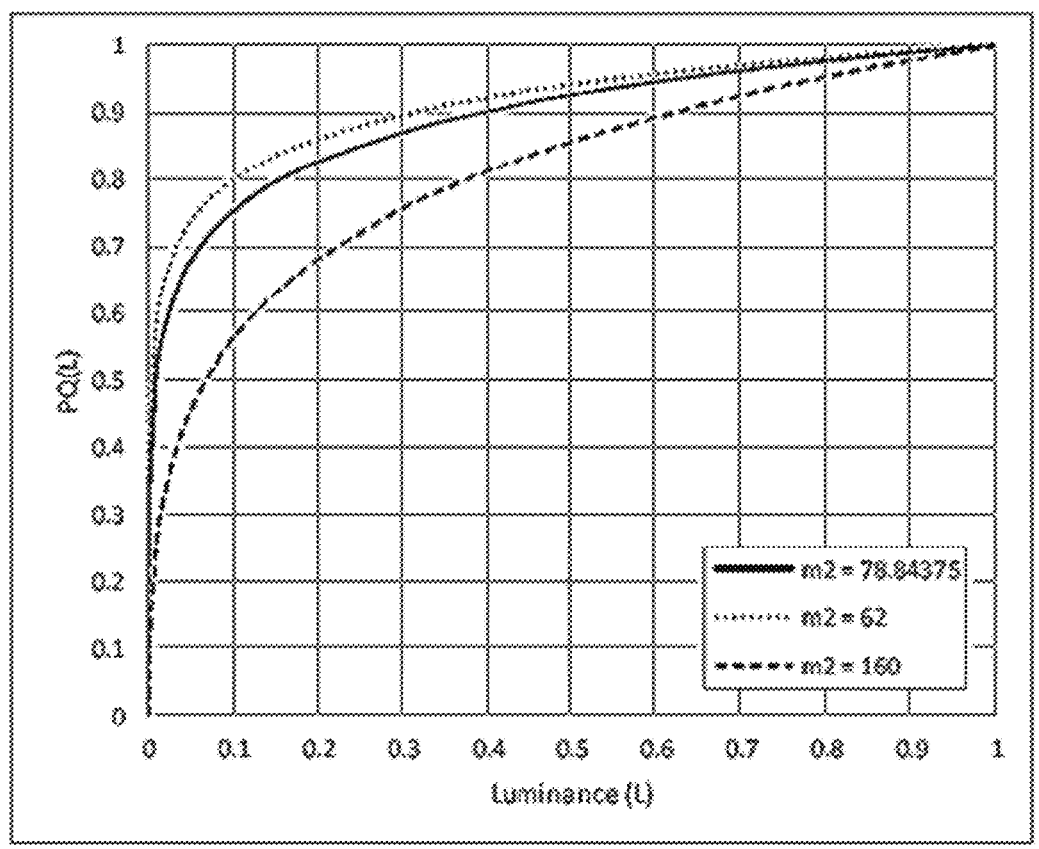
FIG. 11 depicts an example plot of a perceptual quantization transfer function.

As shown in FIG. 11, tuning the value of $m_2$ can adjust the PQ curve for different luminance values. When $m_2$ is set to be less than the 78.84375 value indicated above, such as when $m_2$ is set to 62, the PQ values can be increased throughout some or all of the curve. In contrast, when $m_2$ is set to be greater than the 78.84375 value indicated above, such as when $m_2$ is set to 160, the PQ values can be decreased throughout some or all of the curve.

In some embodiments the block 208 can send, to the associated decoding system, metadata describing the transfer function and the image(s) or region of an image to which it was applied. The decoder can then determine an associated inverse perceptual mapping operation 230 to use during the decoding process. Alternatively, the encoder or the transfer function block 208 within the encoder can determine the inverse perceptual mapping operation and send metadata describing the inverse transfer function to the decoder.

This information may be parameters describing the transfer function or inverse transfer function or it may be a table of values, such as a tone map, that describes the transformation.

As described above, the transfer function 208 may take many forms depending on the processing desired for an image sequence, image or a portion of an image. Various non-limiting examples of the transfer function 208, and the parameters associated with it that can be sent to the decoder to derive inverse coding transfer functions 230, are provided below. In these examples, the coding transfer function used by the block 208 can be denoted as $\psi(I)=v$, such that it can use a brightness or intensity value I in a color component as an input and output a converted value denoted as v. Similarly, while the decoder's inverse coding transfer function 230 can be denoted as $\psi^{-1}(v)=I$, such that it can take a value v and convert it back to a value I. The encoder's uniform quantization operation 212 can be denoted as Q(v), as it can operate on converted v values generated by the coding transfer function 208, as modified by the perceptual normalization block 210 or one of the tone maps 602, 702 or 802. The step size between quantization levels used in the uniform quantization operation 212 can be denoted as $\Delta_{step}$.

The effective quantization step size, Q(I), of a cascaded adaptive coding transfer function 208 can be proportional to the slope of the inverse transfer function 230, as shown below:

$$Q(I) = Q(\psi^{-1}(v)) \approx \frac{d\psi^{-1}(v)}{dv} \Delta_{step}$$

The effective quantization step size, Q(I), can thus depend on the slope of the inverse coding transfer function 230 and the step size $\Delta_{step}$ of the uniform quantization operation 212. For example, when the slope of the inverse coding transfer function 230 decreases, the effective quantization step size Q(I) can decrease. When the step size $\Delta_{step}$ of the uniform quantization operation 212 is large enough that distortion and/or noise introduced by uniform quantization would otherwise be perceptible to human viewers, the effects of the relatively large step size $\Delta_{step}$ can be modulated by adapting the transfer function 208 to the content of the video data, such that the slope of the inverse coding transfer function 230 is smaller. As such, decreasing the slope of the inverse coding transfer function 230 can counteract the effects of a relatively large step size $\Delta_{step}$, and thus modulate the effective quantization step size Q(I) such that the overall distortion and/or noise is less likely to be perceived by a human viewer.

The effective quantization step size Q(I) can be included in a related metric, the relative quantization step size, $\Lambda_{step}$, wherein:

$$\Lambda(I) = \frac{Q(I)}{I}$$

$$\Lambda(I) = \Lambda(\psi^{-1}(v)) = \frac{d\psi^{-1}(v)}{dv} \cdot \frac{1}{\psi^{-1}(v)} \cdot \Delta_{step}$$

The coding transfer function 208, and thus the corresponding inverse coding transfer function 230, can be adapted based on the content of the input video data such that the relative quantization step size $\Lambda(I)$ stays below a set threshold level. For example, the threshold level can be defined by a function $\Lambda_0(I)$ that gives an optimal slope for the inverse coding transfer function 230 that results in encoding with distortion and noise that is perceptually transparent or perceptually lossless. As such the coding transfer function 208, and thus the corresponding inverse coding transfer function 230, can be adapted such that $\Lambda(I) \leq \Lambda_0(I)$.

Similarly, if a perceptually minor or "just noticeable" contrast condition is considered acceptable and is defined by $\Lambda_0(I)$, the following differential equation can apply:

$$\frac{d\psi^{-1}(v)}{dv} \cdot \Delta_{step} - \psi^{-1}(v) \cdot \Lambda_0(\psi^{-1}(v)) = 0$$

As such, solving the above differential equation for $\psi^{-1}(v)$ can provide the decoder's inverse coding transfer function 230 for the desired $\Lambda_0(I)$. Similarly, the relative quantization step size $\Lambda(I)$ can be calculated for any given inverse transfer function 230.

As a first non-limiting example, the coding transfer function 208 and inverse coding transfer function 230 can be based on the first variant of Weber's Law, such that:

$$v_N = \bar{\psi}_{WL1}(I_N) = \begin{cases} \frac{\ln(C \cdot I_N)}{\text{Ln}(C)}, & I_N \geq \frac{e}{C} \\ \frac{C}{e \cdot \ln(C)} \cdot I_N, & I_N < \frac{e}{C} \end{cases}$$

$$I_N = \bar{\psi}_{WL1}^{-1}(v_N) = \begin{cases} C^{v_n^{-1}}, & v_N \geq \frac{1}{\ln(C)} \\ \frac{v \cdot e \cdot \ln(C)}{C}, & v_N < \frac{1}{\ln(C)} \end{cases}$$

In this and other examples below, $I_N$ can be a normalized brightness of a portion of the input video data, on a sub-picture level, picture level, or supra-picture level. The normalized brightness can a brightness level divided by the maximum brightness, such that $$I_N = \frac{I}{I_{max}}$$

In this and other examples below, C can be the maximum contrast in the portion of the input video data on a sub-picture level, picture level, or supra-picture level. The maximum contrast can be the maximum brightness divided by the minimum brightness, such that:

$$C = \frac{I_{max}}{I_{min}}$$

In these and other examples below, $v_N$ can be a value generated by the transfer function 208, normalized by the dynamic range of the uniform quantizer operation 212, denoted as D, such that:

$$v_N = \frac{v}{D}$$

From the above definitions, the relative quantization step size for the first variant of Weber's Law can therefore be given by:

$$\Lambda_{WL1}(I_N) = \begin{cases} \ln(C) \cdot \Delta_{step}, & I_N \geq \frac{e}{C} \\ \frac{e \cdot \ln(C)}{C} \cdot I_N^{-1} \cdot \Delta_{step}, & I_N < \frac{e}{C} \end{cases}$$

As a second non-limiting example, the coding transfer function 208 and inverse coding transfer function 230 can be based on the second variant of Weber's Law, such that:

$$v_N = \bar{\psi}_{WL2}(I_N) = \frac{\ln(C \cdot I_N + 1)}{\ln(C + 1)}$$

$$I_N = \bar{\psi}_{WL2}^{-1}(v_N) = \frac{(C+1)^{v_N} - 1}{C}$$

From this, the relative quantization step size for the second variant of Weber's Law can therefore be given by:

$$\Lambda_{WL2}(I_N) = \ln(C+1) \cdot \left(\frac{C \cdot I_N + 1}{C \cdot I_N}\right) \cdot \Delta_{step}$$

Figure 12:
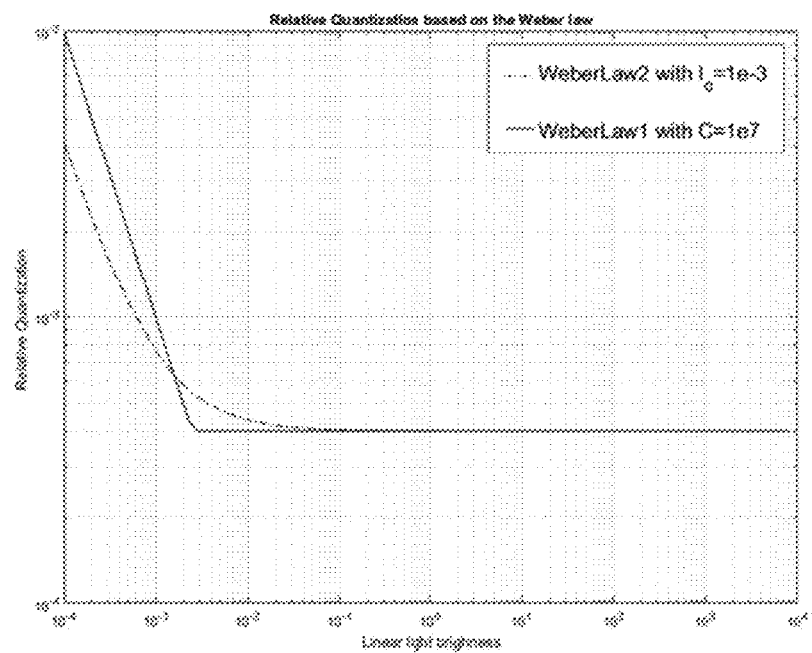
FIG. 12 depicts an example plot of a Weber law transfer function expressed as relative quantization of the input and output data.

The relative quantization step sizes of the two examples above based on variants of Weber's Law can be plotted on a log-log scale, as shown in FIG. 12. The slope of the relative quantization step size based on the first variant of Weber's Law can be linear on the log-log scale with a negative slope for small values of $I_N$, and then be flat (linear on the log-log scale with a slope of 0) for values of $I_N$ that are larger than a particular point. Similarly, the slope of the relative quantization step size based on the second variant of Weber's Law can be negative for small values of $I_N$, and then transition smoothly to approaching a flat slope for larger values of $I_N$. The two variants can thus be similar, with the second variant having a smoother transition between the $I_N$ ranges that have different slopes.

As a third non-limiting example, the coding transfer function 208 and inverse coding transfer function 230 can be based on the first variant of Stevens' Power Law, such that:

$$v_N = \bar{\psi}_{SPL1}(I_N) = \begin{cases} \frac{[(I_N \cdot C)^\gamma - 1]}{(C^\gamma - 1)}, & I_N \geq \frac{C^{-1}}{(1-\gamma)^{\frac{1}{\gamma}}} \\ \frac{\gamma \cdot C}{(C^\gamma - 1) \cdot (1-\gamma)\left(1 - \frac{1}{\gamma}\right)} \cdot I_N, & I_N < \frac{C^{-1}}{(1-\gamma)^{\frac{1}{\gamma}}} \end{cases}$$

$$I_N = \bar{\psi}_{SPL1}^{-1}(v_N) = \begin{cases} C^{-1} \cdot [(C^\gamma - 1) \cdot v_N + 1]^{\frac{1}{\gamma}}, & v_N \geq \frac{\gamma}{(C^\gamma - 1) \cdot (1-\gamma)} \\ \frac{(C^\gamma - 1) \cdot (1-\gamma)^{(1-\frac{1}{\gamma})}}{\gamma \cdot C} \cdot v_N, & v_N < \frac{\gamma}{(C^\gamma - 1) \cdot (1-\gamma)} \end{cases}$$

From this, the relative quantization step size for the first variant of Stevens' Power Law can therefore be given by:

$$\Lambda_{SPL1}(I_N) = \begin{cases} \frac{(1-C^{-\gamma})}{\gamma} \cdot I_N^{-\gamma} \cdot \Delta_{STEP}, & I_N \geq \frac{C^{-1}}{(1-\gamma)^{\frac{1}{\gamma}}} \\ \frac{(C^\gamma - 1) \cdot (1-\gamma)^{(1-\frac{1}{\gamma})}}{\gamma \cdot C} \cdot I_N^{-1} \cdot \Delta_{STEP}, & I_N < \frac{C^{-1}}{(1-\gamma)^{\frac{1}{\gamma}}} \end{cases}$$

As a fourth non-limiting example, the coding transfer function 208 and inverse coding transfer function 230 can be based on the third variant of Stevens' Power Law, such that:

$$\upsilon_N = \bar{\psi}_{SPL3}(I_N) = \frac{(I_N \cdot C + 1)^\gamma - 1}{(C+1)^\gamma - 1}$$

$$I_N = \bar{\psi}_{SPL3}^{-1}(\upsilon_N) = C^{-1} \cdot \left[ [\upsilon_N \cdot ((C+1)^\gamma - 1) + 1]^{\frac{1}{\gamma}} - 1 \right]$$

From this, the relative quantization step size for the third variant of Stevens' Power Law can therefore be given by:

$$\Lambda_{SPL3}(I_N) = ((C+1)^\gamma - 1) \cdot (I_N \cdot C + 1)^{-\gamma} \cdot \frac{I_N \cdot C + 1}{\gamma \cdot I_N \cdot C} \cdot \Delta_{STEP}$$

Figure 13:
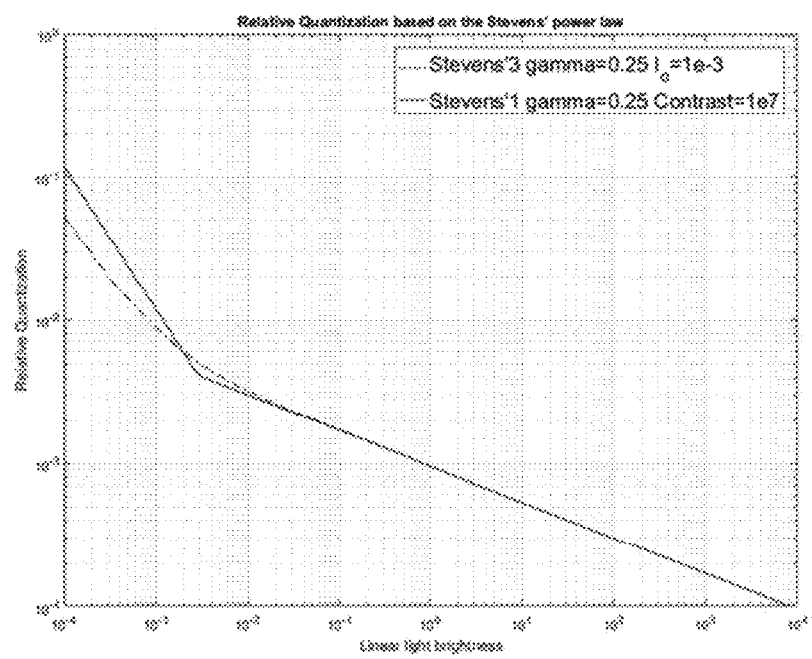
FIG. 13 depicts an example plot of a Stevens' law transfer function expressed as relative quantization of the input and output data.

The relative quantization step sizes of the two examples above based on variants of Stevens' Power Law can be plotted on a log-log scale, as shown in FIG. 13. In both of these examples, the slope of the relative quantization step size can have or approach a slope of −1 for small values of $I_N$, and have or approach a slope of −γ for large values of $I_N$, with the two examples varying on the smoothness of the transition between the $I_N$ ranges that have different slopes. Additionally, as γ goes to 0, the first variant of Stevens' Power Law can converge with the first variant of Weber's Law, while the third variant of Stevens' Power Law can converge with the second variant of Weber's Law.

In the example systems described above, the color conversion operations can include matrix multiply and offset operations, the transfer function operations can be specified as piecewise function operations over a range of values, and the quantization can be scalar or vector over the color components. Example tone mappings include divisive gain operations and perceptual modifications to achieve a desired artistic effect. Perceptual normalization can also include tone mapping operations and can take advantage of intensity and texture masking on a localized basis.

As illustrated in FIGS. 3A and 8A it is possible to perform the chrominance subsampling in the encoder system right after the color space conversion block 206, where the subsequent operations occur in the 4:2:0 color space. Corresponding decoder operations in FIGS. 3B and 8B show the corresponding proposed decoder systems. Similar chrominance sub sampling and color space conversion operations can be made for the other example systems.

The examples described above implement three features:

First, with reference to the system shown in FIG. 2A the transfer function block 208 and optional perceptual normalization block 210 implement a perceptual transformation of the image data which aids in transmitting the HDR and/or WCG data using encoders and decoders, such as Main 10 HEVC, that have a bit-depth which is otherwise incompatible with the HDR and/or WCG data. The transfer function implemented by block 208 may include a perceptual quantization function, a Stevens' Power Law or a Weber Law transfer function with adaptive transfer function parameters. The transfer functions operate in the IPT or YCbCr space and are followed by offset and scaling adjustments. The transfer function 208 may also be applied locally, e.g. at sub-picture level, by either taking advantage of intensity and texture masking on a localized basis or a pre-defined rule, such as a position-based LUT. The sub-picture partitions for local parameter adaptation of the transfer function 208 or other transfer functions implemented in the above examples may be signaled explicitly, e.g. by sending the metadata using SEI or VUI, or computed implicitly from sample values and other information available at the decoder.

Second, any picture adaptive changes made to accommodate the encoding of the HDR and/or WCG data can be incorporated in the reference pictures in the coding loop to improve temporal prediction and coding efficiency.

Third, if an uncompressed SDR version of the HDR and/or WCG video data is available at the encoder, a full reference tone mapping algorithm can be applied to minimize the distortion between the uncompressed SDR version and the graded SDR version. The derived tone mapping parameters can be sent as metadata allowing the decoder to synthesize backward-compatible SDR output data. If the uncompressed SDR version is not available at the encoder, artistic modifications can be incorporated into the tone mapping such that metadata information from analysis can be used in the decoder for synthesis of the backward-compatible SDR video data.

Although the present invention has been described above with particularity, this was merely to teach one of ordinary skill in the art how to make and use the invention. Many additional modifications will fall within the scope of the invention, as that scope is defined by the following claims.

The invention claimed is:

1. A digital video decoding system for decoding a bit stream in a format that does not accommodate a digital video data set including high dynamic range (HDR) and wide color gamut (WCG) video data, to reconstruct an output digital video data set including at least one of HDR and WCG video data, the digital video decoding system comprising:
   a decoder for decoding the bit stream to recover a digital video data set from the bit stream;
   an intermediate color conversion process configured to:
      extract intermediate color conversion metadata from the bit stream, the intermediate color conversion metadata identifying an input color space of the digital video data set extracted from the bit stream and an intermediate color space to which the digital video data set is to be converted;
      convert the inverse transformed portion of the digital video data set from the input color space to the intermediate color space to produce intermediate color converted digital video data; and
   an inverse compression transfer function process configured to extract compression metadata from the bit stream and to apply an inverse compression transfer function to the intermediate color converted video data to generate the digital video data set to be applied to the output color conversion process;
   predictively decode the bit stream using one or more reference frames;
   apply a color conversion process to the output digital video data set, the color conversion process being an inverse of the output color conversion process to generate a color converted video data set;
   generate a perceptual transfer function process from the metadata identifying the inverse perceptual transfer function to be applied to the received video data;
   apply the perceptual transfer function to the color converted video data set to generate a transformed video data set;
   generate a perceptual normalization function using the metadata identifying the inverse perceptual normalization function;

apply the perceptual normalization function to the transformed video data set to generate a perceptually normalized video data set;
generate a further reference frame for use in predictively decoding the bit stream from the perceptually normalized video data set.

2. A digital video decoding system for decoding a bit stream in a format that does not accommodate a digital video data set including high dynamic range (HDR) and wide color gamut (WCG) video data, to reconstruct an output digital video data set including at least one of HDR and WCG video data, the digital video decoding system comprising:
　a decoder for decoding the bit stream to recover a digital video data set from the bit stream;
　an intermediate color conversion process configured to:
　　extract intermediate color conversion metadata from the bit stream, the intermediate color conversion metadata identifying an input color space of the digital video data set extracted from the bit stream and an intermediate color space to which the digital video data set is to be converted;
　　convert the inverse transformed portion of the digital video data set from the input color space to the intermediate color space to produce intermediate color converted digital video data; and
　an inverse compression transfer function process configured to extract compression metadata from the bit stream and to apply an inverse compression transfer function to the intermediate color converted video data to generate the digital video data set to be applied to the output color conversion process;
　receive video data corresponding to a portion of the digital video data set;
　retrieve metadata from the bit stream identifying a transfer function to be applied to the received video data;
　retrieve metadata from the bit stream identifying an inverse perceptual normalization function, including at least one of a gain factor or an offset, to be applied to the received video data;
　generate an inverse perceptual transfer function based on the identified transfer function; and
　apply the generated inverse perceptual transfer function and the inverse perceptual normalization function to the portion of the digital video data set to generate an inverse transformed portion of the digital video data set; an output color conversion process configured to process the inverse transformed portion of the digital video data set to reconstruct the output digital video data set including at least one of HDR and WCG video data.

3. The digital video decoding system of claim 1, wherein the bit stream is a Main 10 High Efficiency Video Coder (HEVC) bit stream and the inverse perceptual transfer function process is configured to extract the metadata from supplemental enhancement information (SEI) data in the bit stream.

4. The digital video decoding system of claim 1, wherein the inverse perceptual transfer function process is configured to receive the portion of the digital video data as one of a group of multiple video frames, a single video frame or a portion of a single video frame.

5. The digital video decoding system of claim 2, wherein the bit stream is a Main 10 High Efficiency Video Coder (HEVC) bit stream and the inverse perceptual transfer function process is configured to extract the metadata from supplemental enhancement information (SEI) data in the bit stream.

6. The digital video decoding system of claim 2 wherein the inverse perceptual transfer function process is configured to receive the portion of the digital video data as one of a group of multiple video frames, a single video frame or a portion of a single video frame.

* * * * *